US008295697B2

(12) United States Patent
Kudo

(10) Patent No.: US 8,295,697 B2
(45) Date of Patent: Oct. 23, 2012

(54) CAMERA AND CONTROLLING METHOD FOR THE SAME

(75) Inventor: Yasunori Kudo, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/027,962

(22) Filed: Feb. 15, 2011

(65) Prior Publication Data

US 2011/0206360 A1 Aug. 25, 2011

(30) Foreign Application Priority Data

Feb. 22, 2010 (JP) ................................. 2010-035970

(51) Int. Cl.
*G03B 7/087* (2006.01)
(52) U.S. Cl. ...................................................... 396/242
(58) Field of Classification Search .................... 396/242
See application file for complete search history.

(56) References Cited

U.S. PATENT DOCUMENTS

| 4,876,566 A | * | 10/1989 | Carcia et al. .................. 396/242 |
| 5,473,375 A | * | 12/1995 | Takayama et al. ............ 348/364 |
| 5,881,326 A | * | 3/1999 | Sakamoto .................... 396/161 |
| 2008/0151062 A1 | * | 6/2008 | Okumura .................. 348/208.1 |
| 2010/0271504 A1 | * | 10/2010 | Kandleinsberger et al. .......................... 348/229.1 |

FOREIGN PATENT DOCUMENTS

| JP | 2002-290828 | 10/2002 |
| JP | 2004-056699 | 2/2004 |

* cited by examiner

*Primary Examiner* — Rodney Fuller
(74) *Attorney, Agent, or Firm* — John C. Pokotylo; Straub & Pokotylo

(57) ABSTRACT

A camera comprises: a photographing unit converting an image formed by a shooting lens into an electric signal; a subject brightness obtaining unit; an exposure computing unit computing a shutter speed and an aperture value; a shutter controlling a time period in which the photographing unit accumulates the electric signal; and an aperture control unit controlling an aperture value of an aperture unit that limits a quantity of light incident from the shooting lens, wherein the exposure computing unit calculates a deviation between a previous exposure amount and a proper exposure amount on the basis of brightness information relating to a previous exposure and output by the subject brightness obtaining unit, the aperture value of the aperture unit, and the shutter speed of the shutter, and computes an aperture value of the aperture unit for a subsequent exposure on the basis of the deviation.

16 Claims, 18 Drawing Sheets

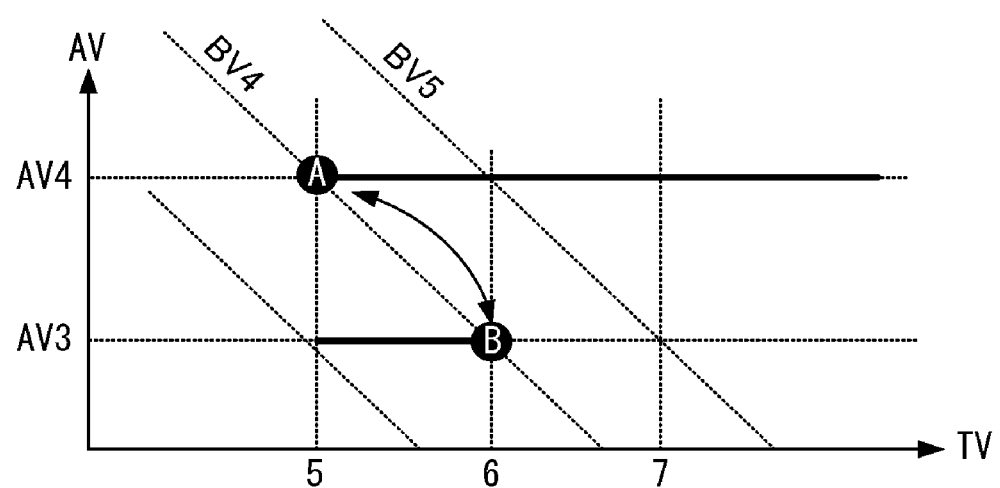
F I G. 3

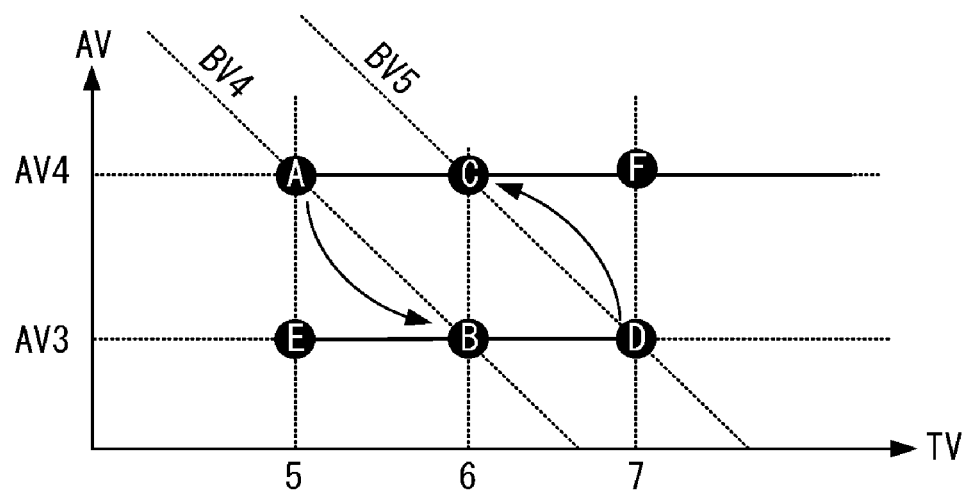
F I G. 5

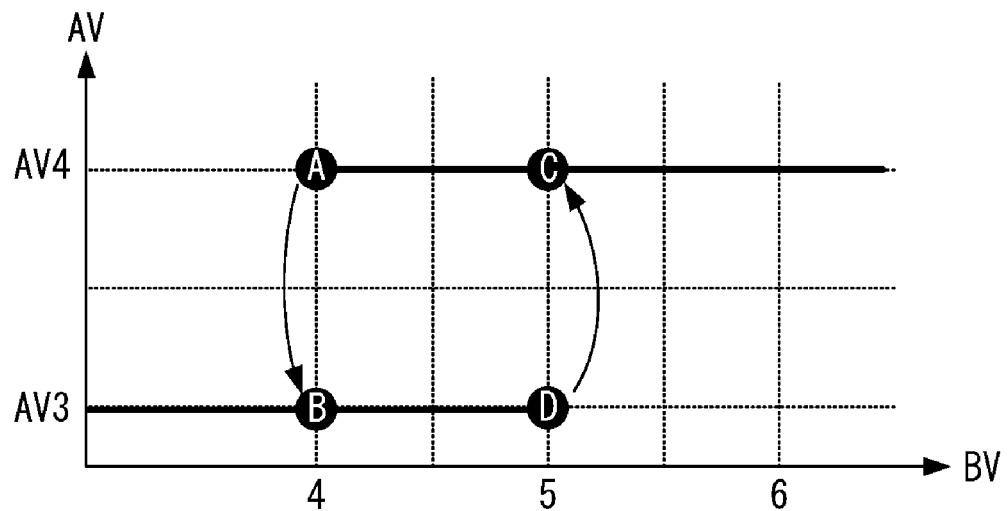
F I G. 6

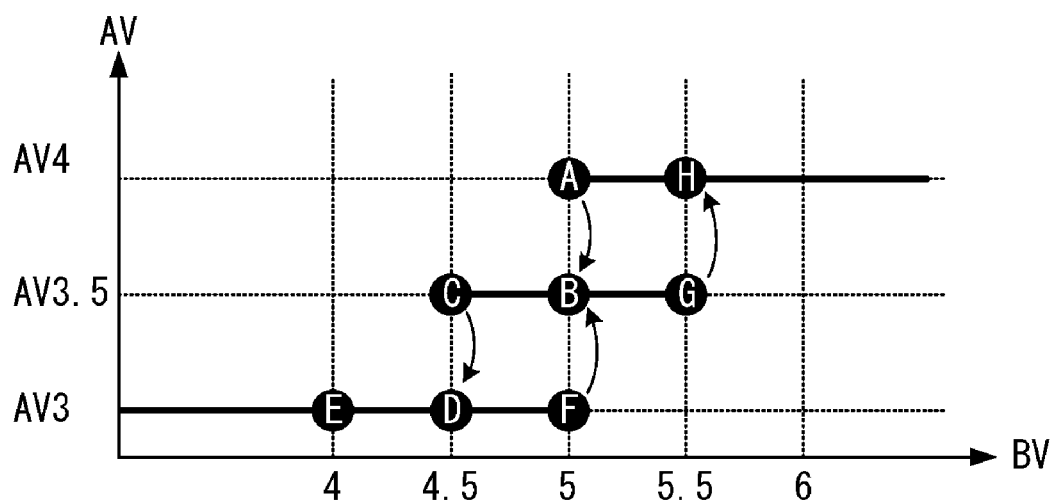
F I G. 8

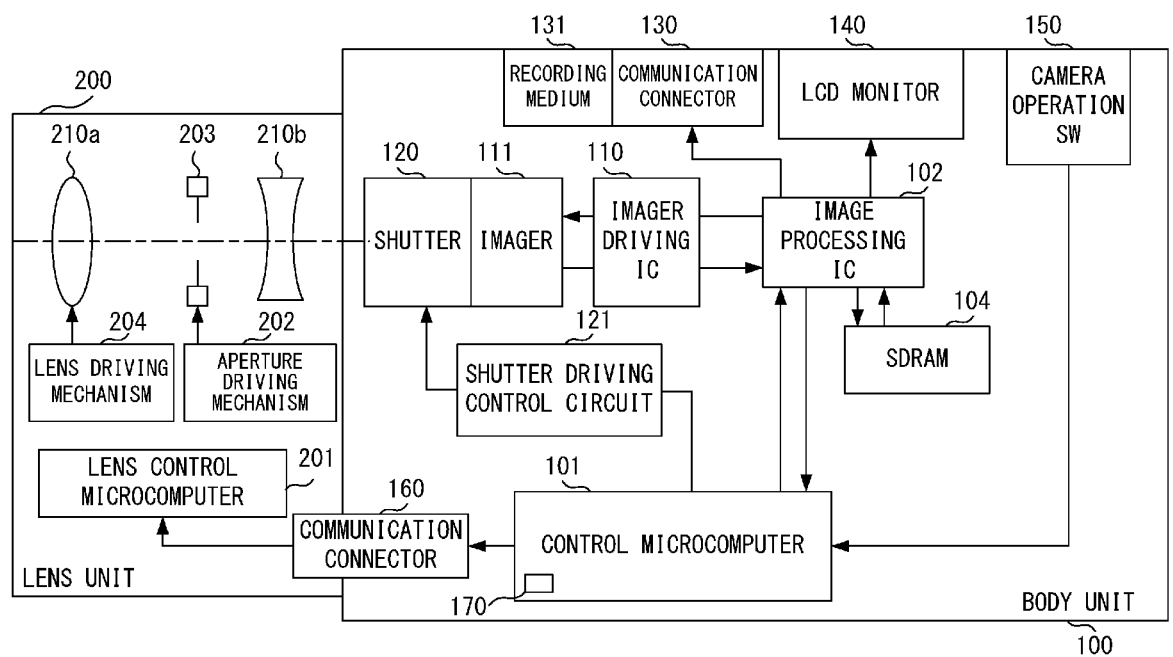
F I G. 9

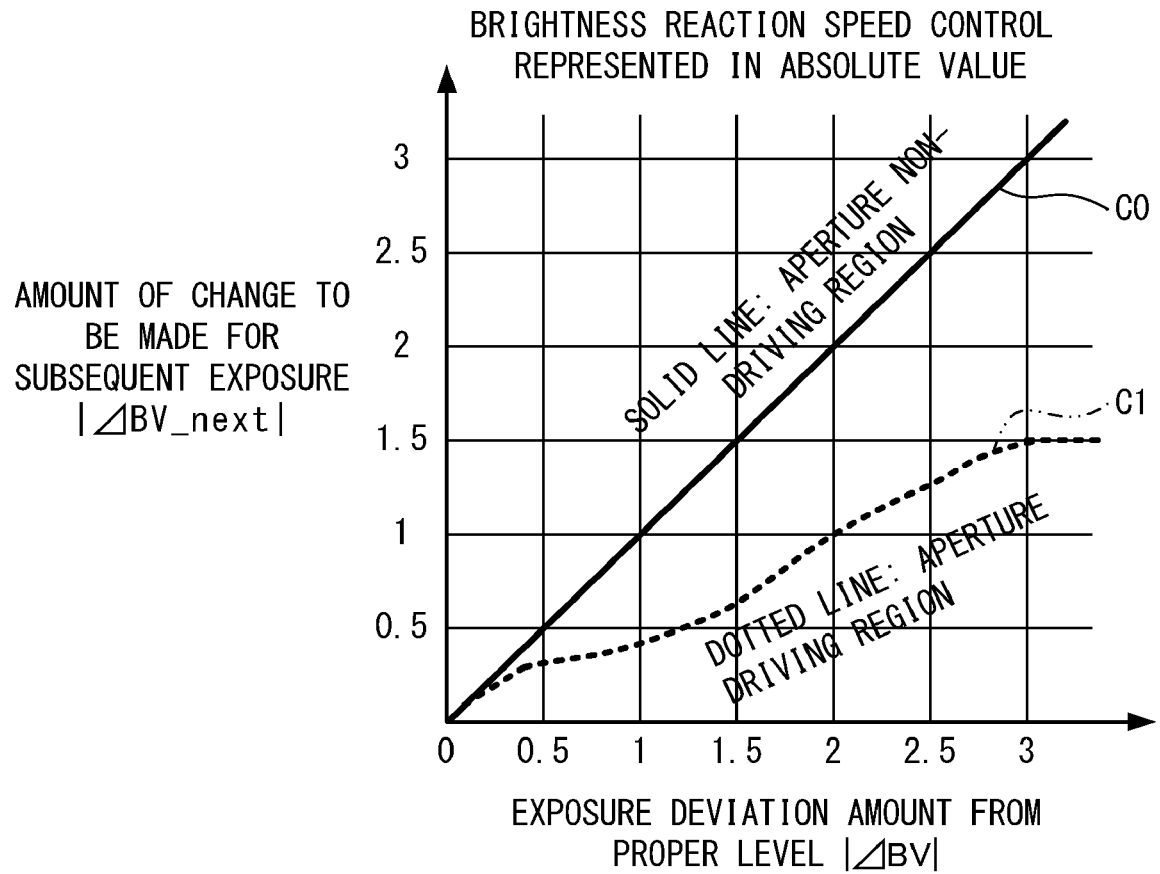
F I G. 1 2

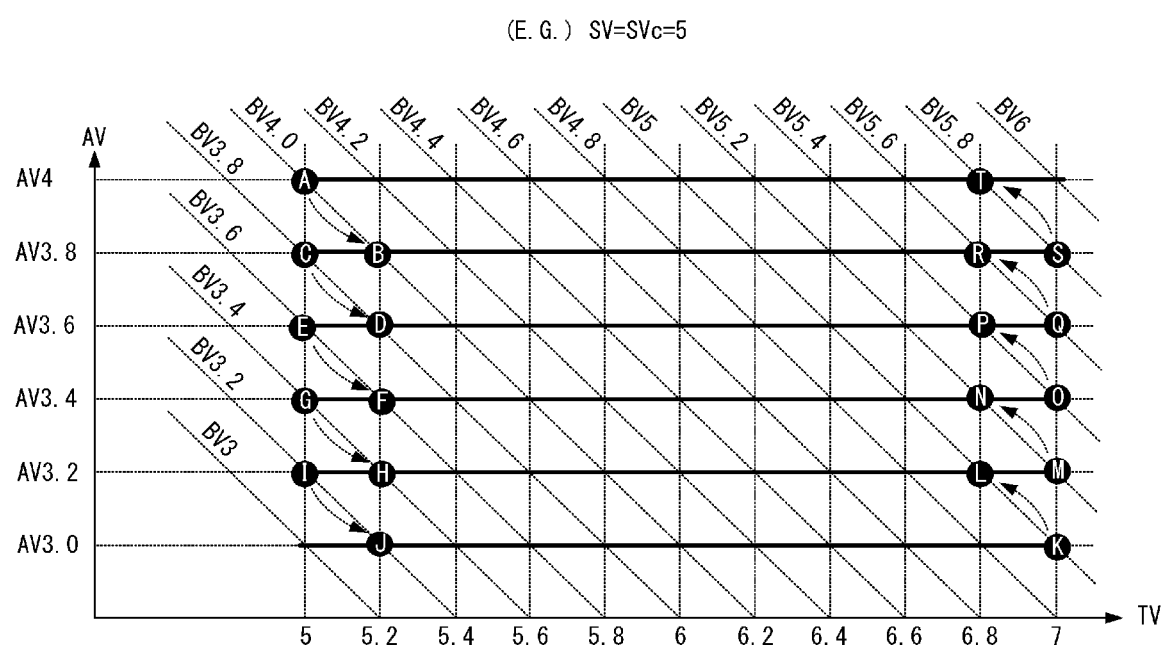
F I G. 1 3

TableG(x)

| ⊿BV | G(⊿BV) |
|---|---|
| −0.2 | −0.2 |
| −0.4 | −0.3 |
| −0.6 | −0.3 |
| −0.8 | −0.3 |
| −1.0 | −0.3 |
| −1.2 | −0.3 |
| −1.4 | −0.4 |
| −1.6 | −0.5 |
| −1.8 | −0.8 |
| −2.0 | −1.0 |
| −2.2 | −1.1 |
| −2.4 | −1.2 |
| −2.6 | −1.3 |
| −2.8 | −1.4 |
| −3.0 | −1.5 |
| −3.2 | −1.5 |

FIG. 16

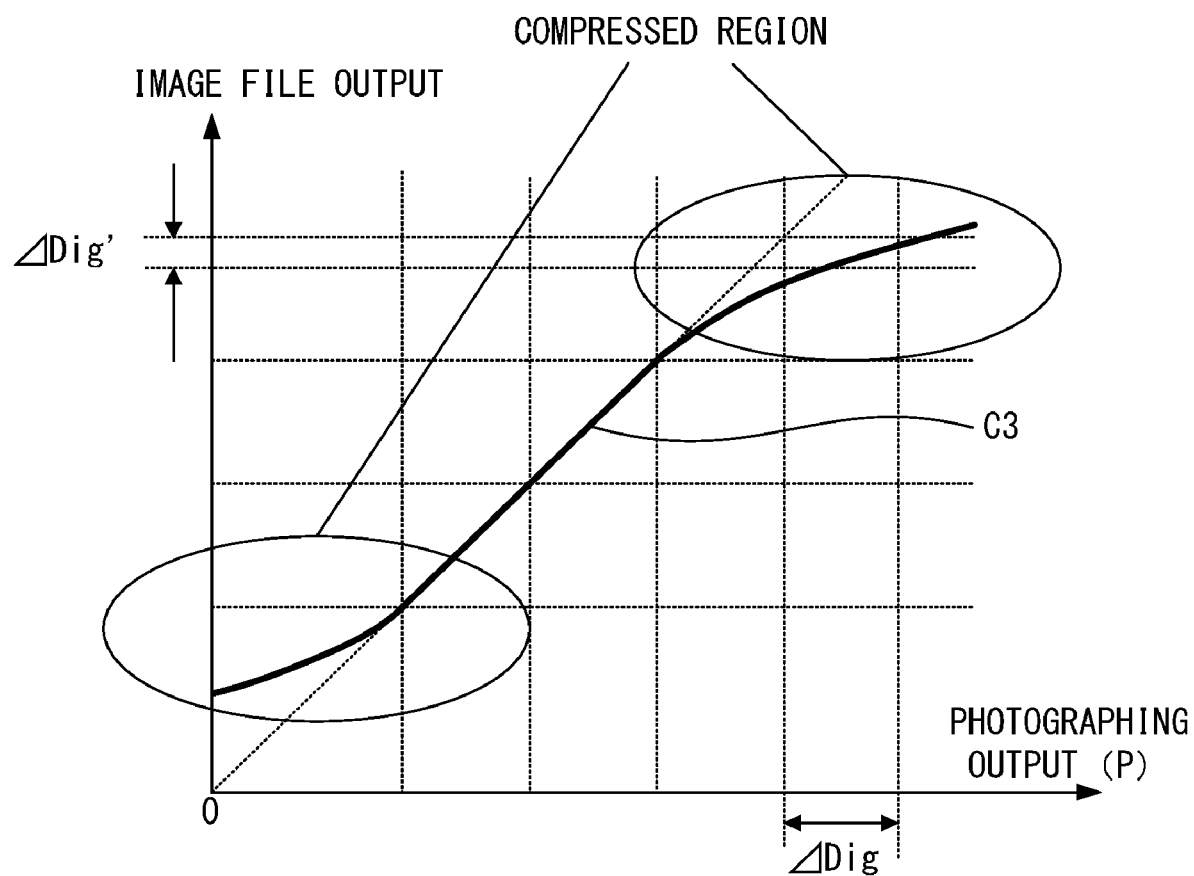
F I G. 1 7

TableH(x)

| ⊿BV | H(⊿BV) |
|---|---|
| 0.2 | 0.2 |
| 0.4 | 0.3 |
| 0.6 | 0.3 |
| 0.8 | 0.3 |
| 1.0 | 0.3 |
| 1.2 | 0.3 |
| 1.4 | 0.4 |
| 1.6 | 0.5 |
| 1.8 | 0.8 |
| 2.0 | 1.0 |
| 2.2 | 1.1 |
| 2.4 | 1.2 |
| 2.6 | 1.3 |
| 2.8 | 1.4 |
| 3.0 | 1.5 |
| 3.2 | 1.5 |

FIG. 18

CAMERA AND CONTROLLING METHOD FOR THE SAME

CROSS-REFERENCE TO RELATED APPLICATIONS

This application is based upon and claims the benefit of priority from the prior Japanese Patent Application No. 2010-035970, filed on Feb. 22, 2010, the entire contents of which are incorporated herein by reference.

FIELD OF THE INVENTION

The present invention relates to a camera and a controlling method for it.

DESCRIPTION OF RELATED ART

As an example, for the purpose of providing many functions or the like, a digital camera is mounted with a live view function with which composition confirmation and the like can be performed by continuously displaying, on the monitor, an image formed on the imager and a moving image shooting function with which images formed on the imager are consecutively captured and recorded.

In order to display and record these consecutive images at a proper brightness, it is necessary to maintain the proper brightness of an image by controlling the electronic shutter speed, the aperture, and the sensitivity value in accordance with the change in brightness of a subject.

In regard to an exposure control performed via an electronic control such as a control of an electronic shutter and a sensitivity value, since the control change is completed while moving images are switching over to the subsequent screen, an intended exposure can be set for each fame; however, since an aperture control accompanying mechanical driving takes a long time, the relationship between the subject brightness, the aperture value, the shutter speed, and the sensitivity value is lost and a frame for which exposure is not properly performed is generated, and therefore the image quality in the live view display or the moving image recording will be degraded.

In order to address this technical problem, in, cameras for moving image recording, an aperture mechanism optimized for moving images is used. In other words, the configuration is made such that the aperture can be switched without requiring step-by-step switching operations; therefore, the aperture is changed slowly over a long period of time and the brightness variation per unit time is decreased, thereby preventing flickering from occurring.

FIG. 1 indicates an aperture control performed when an aperture that can be switched without requiring step-by-step switching operations is used. VD indicates a vertical synchronizing signal for controlling an imager. An operation for photographing one screen is started when VD upsurges.

An integration period is a period in which charges, provided by currents output via pixels of the imager receiving light, are accumulated, and is the period of exposure time of the photographing.

FIG. 1 illustrates an example in which, for a number of frame periods, the aperture is changed slowly from F5.6 to F4.

If the aperture is slowly changed like this, then a feedback control can be performed in which, in accordance with the exposure minutely changed by the aperture, the shutter and the sensitivity value are controlled in the direction in which the minute change will be eliminated in the subsequent frame so that the deviation from the proper exposure which appears during the driving of the aperture is held at a minute level. As a result of this, a proper light exposure can be achieved.

In static image photographing, a good response (i.e., the shortening of a release time lag) is always pursued.

It is necessary to quickly handle the brightness variation in a subject and to always perform displaying at a proper exposure. When the aperture is moved slowly and when the subject causes a large brightness variation in a short time, the camera cannot capture the subject and it takes a long time for the subject to be displayed at a proper exposure, and therefore, there is a technical problem in which a shutter chance may be missed.

The aperture of a shooting lens designed for static images needs to be quickly driven in order to reduce a release time lag; therefore, step driving is generally used as an aperture driving method.

When a lens having an aperture that is driven using step driving specialized in static image shooting is used for moving image shooting, an operation such as the one indicated in FIG. 2 will be performed. In other words, when an aperture is changed during the third from the left upsurge period of the vertical synchronizing signal VD, the exposure is suddenly changed during the photographing integration. This will destabilize the brightness of images during the integration period.

In other words, when moving image shooting is performed using a lens specialized in static image shooting, there are technical problems such as: an accurate aperture value will be unknown while the aperture is driven; when the AV value is changed significantly, the image looks brighter for an instant, and this degrades the appearance of the live view image; when a lens for static image shooting is used, a photometric value cannot be measured while the aperture is driven since the AV value is unknown; and the like.

As an example, in the example indicated by FIG. 2, the aperture is opened up so that the AV value changes from AV 5 to AV 4.5. In this example, if the level of a subject brightness is very small so that the change can be ignored, then, in order to achieve a proper exposure, it will be necessary to increase the shutter speed so that the shutter speed after the driving of the aperture is 0.5 steps faster than that before the driving of the aperture.

However, an aperture value is not fixed while the aperture is driven. Therefore, if the shutter speed and the sensitivity value state before the driving of the aperture are maintained, then, in regard to frames during aperture driving, extraordinarily bright images will be displayed in the monitor or will be recorded as moving images.

Due to such a technical problem, when a lens for static image shooting is mounted, a single-lens camera for static image shooting is generally used and is configured so that the aperture is not changed while moving images are being recorded.

As with the case in moving image shooting, live views, for which composition confirmation can be performed by constantly displaying photographing outputs on a monitor, have a technical problem similar to that indicated by FIG. 2 when the aperture is driven during the live view operation.

As countermeasures for resolving this technical problem, processes are generally performed in which images of a previous frame are displayed without displaying or recording an image at which exposure deviation occurred while the aperture was driven and in which control is performed under an aperture open state as much as possible.

In regard to a camera having such an aperture, FIG. 2 indicates that a proper photometric value cannot be obtained while the aperture is driven. In this camera, a photometric value is not measured while the aperture is driven. In other words, an exclusive control will be performed in which, after a photometric value measuring operation is terminated, the aperture is driven, and after the driving of the aperture is terminated, the photometric value measuring operation is restarted.

As countermeasures for resolving the technical problems above which are caused when moving image shooting is performed using a camera for which an interchangeable lens provided with a step-driving type aperture is used, the following prior art is known.

Patent document 1 discloses a technology for performing a proper operation. In this technology, the number of aperture steps (the number of control positions) which are used for moving image shooting performed when a lens for a silver salt film is mounted is made smaller than the number of controllable aperture steps (control positions) so that aperture steps (control positions) switched during the moving image shooting have fewer divisions.

As described above, when aperture steps (control positions) have fewer divisions, frequency reduction can be expected since the number of points at which aperture variation occurs is decreased within a predetermined scope of control. However, exposure deviation will be greater in accordance with the driving of the aperture; therefore, there is another technical problem in which image flickering is made greater.

In patent document 2, two points are established for shutter speed; a hysteresis is provided in which, when a subject becomes bright, an aperture is driven at a high shutter-speed to the side at which it is narrowed, and when the subject becomes dark, the aperture is opened up at the low shutter-speed point. By this hysteresis, such a technical problem that the aperture to be operated frequently, such as via minute brightness variations in the subject at the brightness point at which the aperture is driven, and the operation sound of the aperture driving mechanism is recorded as the noise of moving image shooting, is to be resolved in the patent document 2.

PRIOR ART DOCUMENTS

Patent Documents

Patent Document 1: Japanese Laid-open Patent Publication No. 2002-290828
Patent Document 2: Japanese Laid-open Patent Publication No. 2004-056699

SUMMARY OF THE INVENTION

FIG. 3 is a program diagram indicating the relationship between an aperture drive, a shutter speed, and brightness under a situation in which a hysteresis is not provided. TV6 indicates a high shutter-speed and TV5 indicates a low shutter-speed. For simplicity, the sensitivity value is fixed at SV5.

FIG. 4 illustrates a relationship between brightness and the movement of the aperture under a situation in which such a control is performed. When the aperture is changed by one step at the subject brightness BV4 and when the subject always has 0.1 step brightness variation due to the movement of a human or the like, the aperture is changed by one step every time 0.1 step variation occurs; therefore, the brightness of obtained images will be unstable.

Accordingly, if the method described in patent document 2 is used and if TV7 is the point of the high shutter-speed and TV5 is the point of the low shutter-speed as indicated in the program diagram of FIG. 5, then a hysteresis is configured as indicated in the program diagram of FIG. 6 indicating the ratio of the brightness and the aperture. In this hysteresis, in correspondence with one-step brightness variation, the AV value becomes different between the direction in which the BV value increases and the direction in which it decreases.

In such a configuration, once the aperture becomes AV3 at BV4, the aperture wouldn't become AV4 again without the brightness being increased by one step from BV4; therefore, the frequency of the aperture changing can be decreased.

However, if there is a one-step change during the driving of the aperture, the exposure will deviate by one step at most during the driving of the aperture indicated in FIG. 2. During the deviation, the appearance of the moving image will be degraded. There still remains such a technical problem.

If this hysteresis is configured to be small, the frequency of the driving of the aperture will be high, and if the subject brightness is further changed by one step, the aperture will also be driven by about one step.

FIGS. 7 and 8 each indicate an example of a program diagram under a situation in which a 0.5 step hysteresis is configured.

If the brightness variation is about 0.5 step, the aperture driving will be 0.5 step. However, if the subject brightness varies from 4.6 to 5.6 in FIG. 8, the aperture will change by one step from AV3 to AV4; therefore, there is a technical problem in which even if a minute hysteresis width is established, the exposure still deviates significantly when the aperture moves a significant amount.

The object of the present invention is to provide a camera that can improve the appearance of live view images provided by driving the aperture during moving image shooting and that can improve the image quality of recorded moving images without being affected by the operating characteristics and the like of the aperture mechanism of a mounted lens.

The present invention provides a camera with which at least one of moving image shooting and live view displaying can be performed, the camera comprising:
photographing means for converting an image formed by a shooting lens into an electric signal;
shutter means for controlling a time period in which the photographing means accumulates the electric signal;
sensitivity value setting means for setting a sensitivity value of photoelectric conversion for a light-receiving amount of the photographing means;
subject brightness obtaining means for obtaining a subject brightness; and
aperture control means for controlling an aperture value of aperture means that controls a quantity of light incident from the shooting lens, wherein
the aperture control means calculates a deviation from a proper exposure level from brightness information output by the subject brightness obtaining means, the aperture value of the aperture means, a shutter speed of the shutter means, and a sensitivity value of the sensitivity value setting means, and, in accordance with the deviation, the aperture control means controls an amount of change in the aperture value of the aperture means which is undergone in a predetermined time period or in an operation time period in which the photographing means obtains images in a predetermined number of frames.

Effect of the Invention

According to the present invention, it is possible to provide a camera that can improve the appearance of live view images and the image quality of recorded moving images provided by driving the aperture during moving image shooting, without being affected by the operating characteristics and the like of the aperture mechanism of a mounted lens.

BRIEF DESCRIPTION OF THE DRAWINGS

FIG. 3 shows a program diagram indicating, as a reference technology of the present invention, the relationship between aperture driving, a shutter speed, and brightness in a situation in which a hysteresis is not provided.

FIG. 5 shows a program diagram indicating, as a reference technology of the present invention, a relationship between aperture driving, a shutter speed, and brightness in a situation in which a one-step hysteresis is provided.

FIG. 6 shows a program diagram indicating, as a reference technology of the present invention, a relationship between aperture driving and brightness in a situation in which a one-step hysteresis is provided.

FIG. 8 shows a program diagram indicating, as a reference technology of the present invention, a relationship between aperture driving and brightness in a situation in which a 0.5-step hysteresis is provided.

FIG. 9 shows a conceptual diagram indicating a configuration of a camera according to one embodiment of the present invention.

FIG. 12 shows a diagram indicating an example of a brightness reaction speed control via an exposure parameter calculation process performed by a camera according to one embodiment of the present invention.

FIG. 13 shows a program diagram of a camera according to one embodiment of the present invention, the program diagram indicating a hysteresis control example of the AV value and the TV value relative to the brightness BV.

FIG. 16 shows a diagram indicating an establishment example of an aperture driving region for functions used for the brightness reaction speed control performed by a camera according to one embodiment of the present invention.

FIG. 17 shows a diagram indicating an example of a relationship between a typical photographing output and digital data of a moving image file and an image file recorded in a recording medium.

FIG. 18 shows a diagram indicating an establishment example of an aperture driving region for a function used for the brightness reaction speed control performed by a camera according to one embodiment of the present invention.

DETAILED DESCRIPTION OF THE PREFERRED EMBODIMENTS

Figure 1:
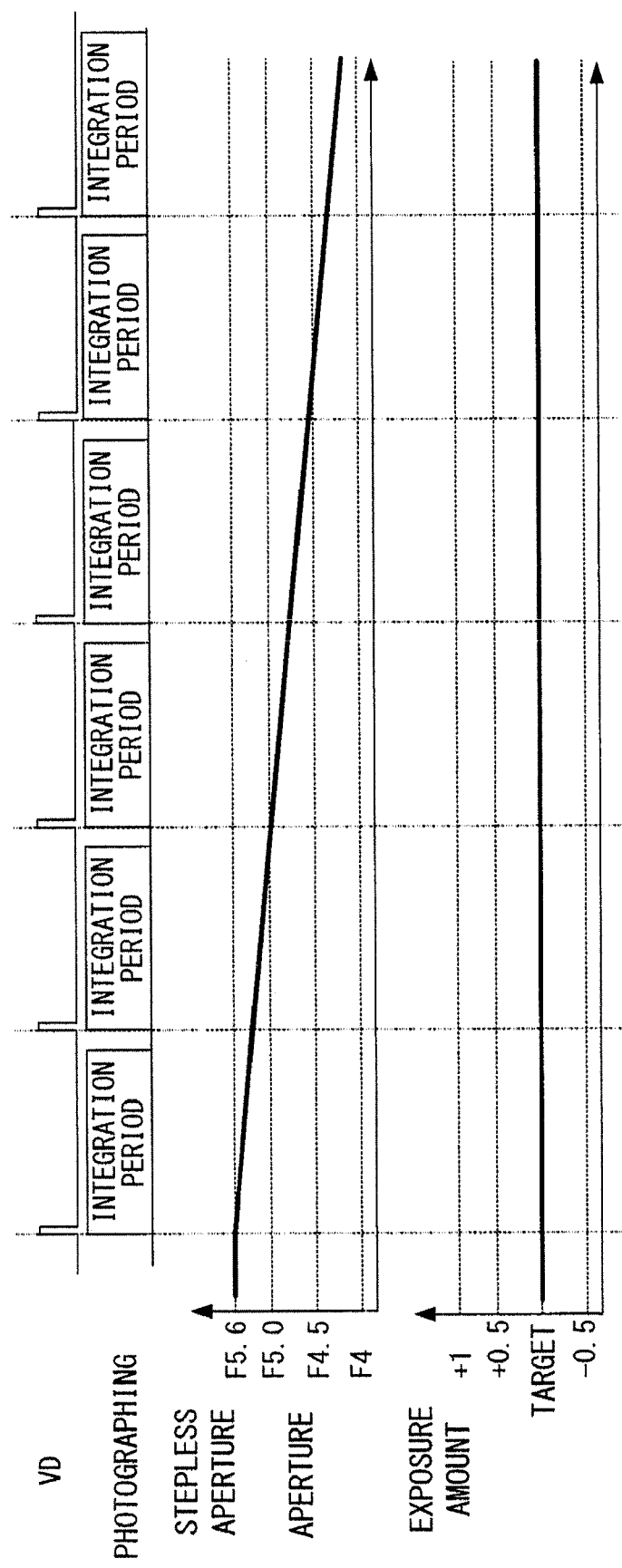
FIG. 1 shows a diagram indicating an exposure control of a camera only for moving images which is a reference technology of the present invention.
Figure 2:
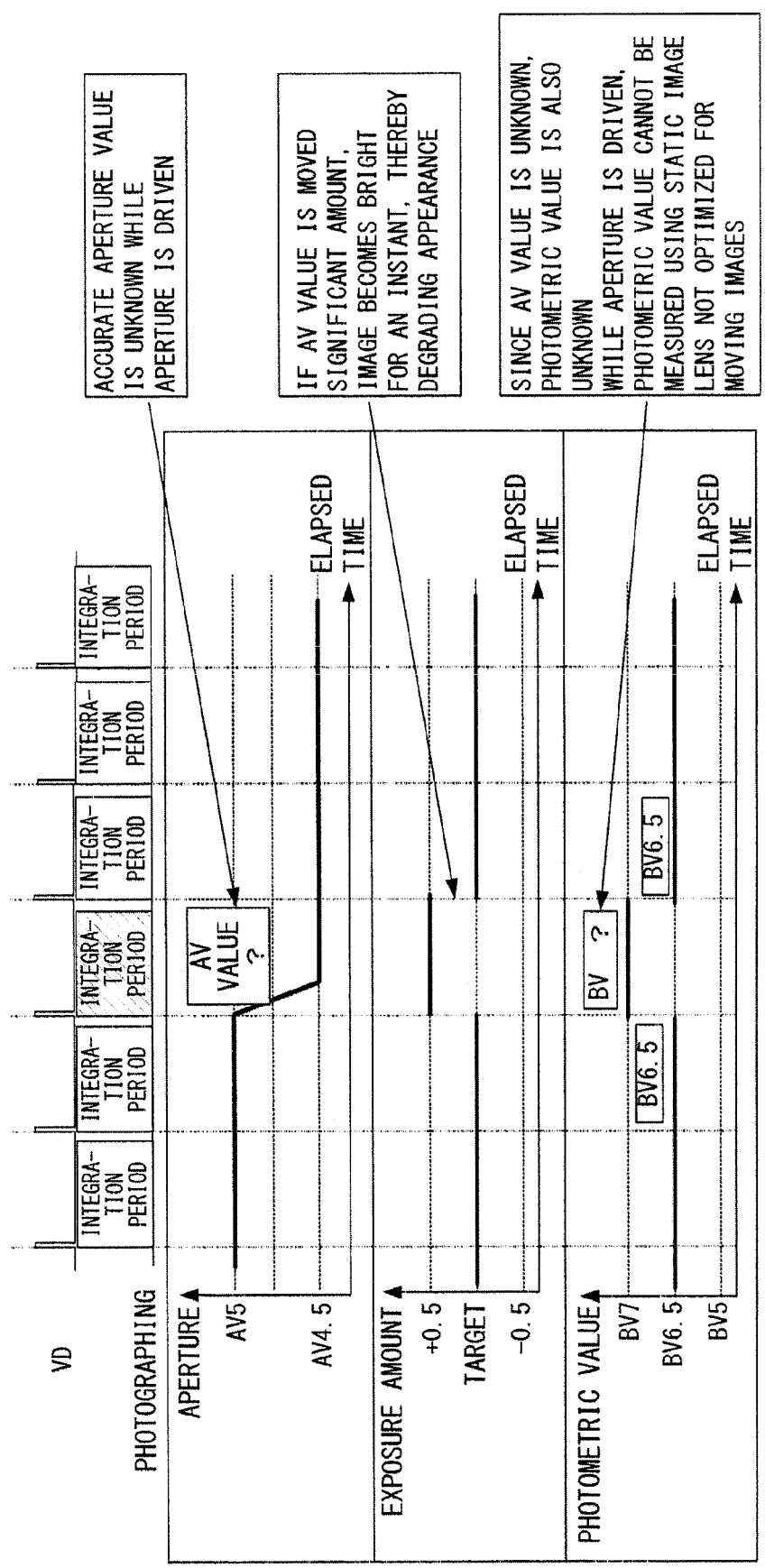
FIG. 2 shows a diagram illustrating a technical problem of moving image shooting performed by a camera having an aperture mechanism optimized for static image shooting, the camera being a reference technology of the present invention.
Figure 4:
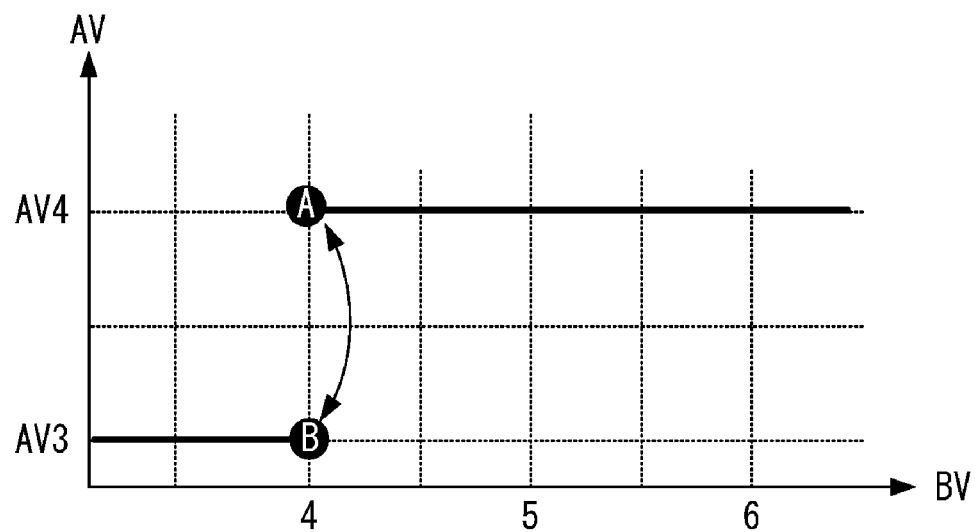
FIG. 4 shows a program diagram indicating, as a reference technology of the present invention, a relationship between aperture driving and brightness in a situation in which a hysteresis is not provided.
Figure 7:
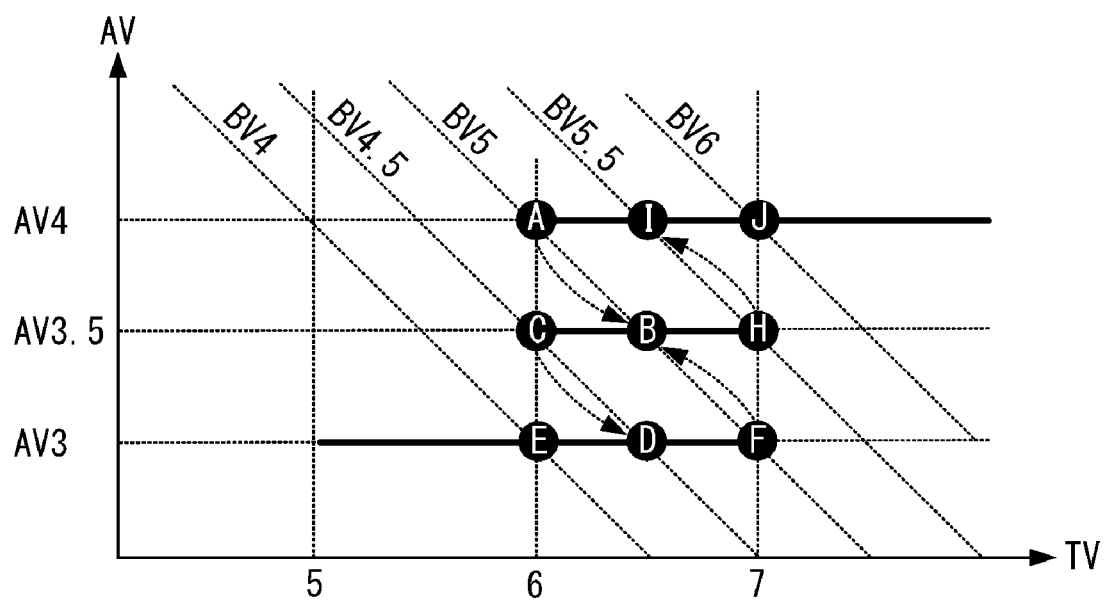
FIG. 7 shows a program diagram indicating, as a reference technology of the present invention, a relationship between aperture driving, a shutter speed, and brightness in a situation in which a 0.5-step hysteresis is provided.

In the present embodiment, in live view shooting and moving image shooting for displaying, on a monitor, images output from the imager, fluctuation in brightness of the images, which appears when the aperture is driven during moving image shooting, is controlled to suppress. The present embodiment is effective for, for example, a lens having an aperture mechanism that is optimized for static image shooting.

When it is determined that the aperture value used for the previous exposure should be changed for the subsequent exposure, the driving amount of an aperture to be moved in one aperture driving action is controlled so as to obtain an optimum value by changing the response speed of exposure control in accordance with the brightness of the subject.

In other words, in the present embodiment, as one example of an aspect, in photographing for which images obtained by consecutive photographing operations are used (such as in live view display or moving image recording), and also in a camera for which the aperture value cannot be obtained while the aperture is driven, a hysteresis for aperture control is configured to be, for example, about ⅙ step in order to suppress flickering in the brightness of moving images, and at the same time, in moving image shooting, when it is determined that the aperture value used for the exposure of the previous frame should be changed for the exposure of the next frame, then by changing the response speed of exposure control to that of brightness variation in the subject, the amount of aperture driving of the aperture to be moved in one aperture driving action is controlled so as to obtain an aperture driving amount that corresponds to the characteristic of the aperture mechanism.

Accordingly, even when, for example, shooting is performed using a lens that is specialized for still images, that is not suitable for moving image recording, and that comprises a step-driving type aperture mechanism, flickering of brightness can be suppressed by suppressing exposure errors and variation frequency during the driving of the aperture in moving image shooting, and while maintaining a proper response to brightness variation in the subject, it is possible to improve the quality of monitor display images of the live view and the quality of recording images in moving image recording.

Embodiments of the present invention will be described in detail in the following with reference to the drawings.

FIG. 9 shows a conceptual diagram indicating a configuration of a camera according to one embodiment of the present invention. In the present embodiment, as an exemplary camera, a digital single-lens reflex camera in which the lens is interchangeable is used.

The digital single-lens reflex camera according to the present embodiment (hereinafter simply referred to as "camera") comprises: a body unit 100; a lens unit (i.e., a lens barrel) 200 which is, for example, replaceable; and a recording medium 131 for recording shot image data.

The lens unit 200 can be attached and detached via a lens mount (not shown) provided on the front face of the body unit 100. The lens unit 200 is replaceable.

The lens unit 200 is configured with shooting lenses 210a (a shooting lens) and 210b, an aperture 203 (an aperture unit), a lens driving mechanism 204, an aperture driving mechanism 202, and a lens control microcomputer (hereinafter referred to as "Lμcom") 201.

The shooting lenses 210a and 210b are driven in the optical axis direction by a DC motor (not shown) provided within the lens driving mechanism 204. The aperture 203 is driven by a stepping motor (not shown) provided within the aperture driving mechanism 202.

The Lμcom 201 drives and controls various parts within the lens unit 200, such as the lens driving mechanism 204 and the aperture driving mechanism 202. The Lμcom 201 is electrically connected via a communication connector 160 to a body control microcomputer 101 (an aperture control unit) (hereinafter referred to as "Bμcom 101"), which will be described later. The Lμcom 201 can transmit and receive various pieces of data to and from the Bμcom 101. The Lμcom 201 is controlled by the Bμcom 101.

Meanwhile, the body unit 100 comprises: an imager 111 (a subject brightness obtaining unit) (a photographing unit); an imager driving IC 110 (a shutter) (a sensitivity value setting unit); an image processing IC 102; an SDRAM 104; a shutter unit 120 (a shutter); a shutter driving control circuit 121; a communication connector 130; an LCD monitor 140; a camera operation switch 150; the Bμcom 101; and the like.

A light flux provided from a subject (not shown) and incident through the shooting lenses 210a and 210b and the aperture 203 within the lens unit 200 passes through the focal-plane shutter unit 120 on the optical axis and through the optical system, and is incident on the imager 111 for electrically converting a subject image.

A light flux that passed through the shooting lenses 210a and 210b is converted into an image by the imager 111. The photoelectric conversion operation of the imager 111 is controlled by the imager driving IC 110. The imager driving IC 110 controls the sensitivity value of the photoelectric conversion at the imager 111 on the basis of instructions from the Bμcom 101 and the like.

Accordingly, the imager 111 electrically converts the subject image formed as described above into an analog electric signal. The electric signal is converted by the imager driving IC 110 into a digital electric signal to be processed by the image processing IC 102. The digital electric signal is converted by the image processing IC 102 into an image signal.

In the body unit 100, the imager 111, the imager driving IC 110, the SDRAM (Synchronous Dynamic Random Access Memory) 104 provided as a storage region, and the LCD monitor 140 are connected to the image processing IC 102 for performing image processing, and the recording medium 131 is also connected to the image processing IC 102 via the communication connector 130. They are configured so that an electronic photographing function and an electronic recording display function can be provided.

The recording medium 131 is an external recording medium, such as a semiconductor memory card of any type or an external hard disk drive (HDD). The recording medium 131 can communicate with the body unit 100 via the communication connector 130. The recording medium 131 is mounted so that it can be replaced with another part.

The image processing IC 102 is connected to the Bμcom 101 for controlling the parts within the body unit 100. The Bμcom 101 has a timer (not shown) that measures shooting intervals of serial-shooting. The Bμcom 101 has a control unit for controlling the operation of the entirety of the camera, and also has a counting unit, a mode setting unit, a detection unit, a determination unit, a computing unit, and the like.

The Bμcom 101 is connected to the communication connector 160, the shutter driving control circuit 121, and the like. The Bμcom 101 is further connected to the LCD monitor 140 for reporting to the photographer the operating state of the camera via a display output, the camera operation switch (SW) 150, and a power supply (not shown).

By mounting the lens unit 200 on the body unit 100, the Bμcom 101 and the Lμcom 201 are electrically connected so that they can communicate with each other via the communication connector 160. Via the Lμcom 201 being operated depending on and in cooperation with the Bμcom 101, the functions of the digital camera are achieved.

In this case, by executing a control program 170 stored in a nonvolatile semiconductor memory or the like (not shown), the Bμcom 101 controls the entirety of the body unit 100 and the lens unit 200 as described above and achieves a control operation, such as the one illustrated by the flowchart which will be described later.

The shutter driving control circuit 121 controls the movement of the front curtain and the rear curtain (not shown) provided at the shutter unit 120, and transmits and receives, to and from the Bμcom 101, a signal for controlling opening and closing of the shutter and a signal provided when the running of the front curtain is completed.

In the present embodiment, in addition to the shutter unit 120, the imager driving IC 110 is provided with an electronic shutter function for moving image shooting. When moving image photographing is performed, the shutter unit 120 is released and the shutter speed of the electronic shutter function is controlled by the Bμcom 101.

When static image shooting is performed, shooting is performed via, for example, the operation of the shutter unit 120 at a predetermined shutter speed.

The LCD monitor 140 reports to the user (photographer) the operating state of the camera via a display output.

The camera operation switch 150 is composed of a switch group including operation buttons (operation units) which are needed for the user to operate the camera; for example, a release switch for giving an instruction to perform a shooting operation, a mode-changing switch for switching the shooting mode to a serial shooting mode, a normal shooting mode, or the like, and a power switch for switching on or off the power supply.

The body unit 100 is provided with a power supply circuit (not shown), which is configured so that a voltage provided by a battery (not shown) serving as a power supply is converted into a voltage needed by each circuit unit of the camera.

Although not shown, the body unit 100 is provided with a microphone, which detects external sounds and the like; therefore, the image processing IC 102 and the Bμcom 101 can record and store, into the recording medium 131, moving images obtained by the imager 111 together with sounds.

Next, the shooting operation and the live view operation performed by the camera according to the present embodiment will be described.

<Shooting Operation>

First, when the image processing IC 102 is controlled by the Bμcom 101, which executes the control program 170, and when image data obtained by the imager 111 and converted into a digital signal by the imager driving IC 110 is input into the image processing IC 102, the image processing IC 102 saves the image data in the SDRAM 104, which is a memory for temporal saving.

The SDRAM 104 is also used as a work area for the image processing IC 102 to perform image processing. The image processing IC 102 can perform image processing such that the image data is converted into data corresponding to a desired image data exchange standard (e.g., JPEG data), and can save it in the recording medium 131.

When the shutter driving control circuit 121 receives from the Bμcom 101 a signal for driving and controlling the shutter, it controls the shutter unit 120 so that the shutter unit 120 opens or closes the shutter. At the same time, a predetermined image processing operation is performed on the output image data obtained by the imager 111 and is converted into a digital signal by the imager driving IC 110, and the recording medium 131 records the image data, thereby completing the shooting operation of static images.

<Live View Operation and Moving Image Recording>

Light fluxes from the shooting lenses 210a and 210b are led to the imager 111. Output image data, obtained by the imager 111 and converted into a digital signal by the imager driving IC 110 when, for example, about 30 frames are consecutively exposed for each second, can be converted into a video signal by the image processing IC 102 and this video signal can be provided for the LCD monitor 140, thereby displaying the moving image of the subject on the LCD monitor 140.

Such displaying is called "live view", which is well known. In order to cause the camera according to the present embodiment to provide the live view displaying of image data on the LCD monitor 140, the user selects a live view mode by operating the mode-changing switch included in the camera operation switch 150 described above. "Live view" is hereinafter sometimes referred to as "LV".

Moving image recording is performed by creating a moving image file using the image processing IC 102 and by recording this image file in the recording medium 131 via the communication connector 130. The user can perform moving image recording by operating a switch for starting and stopping moving image recording, the switch being provided at the camera operation switch 150.

During the LV operation, light fluxes from the shooting lenses 210a and 210b are always led to the imager 111; therefore, on the basis of output image data obtained by the imager 111 and converted into a digital signal by the imager driving IC 110, the image processing IC 102 can be caused to perform a photometric value measurement operation for the brightness of the subject and a well-known distance-measuring operation for the subject.

The photometric value measurement operation of the brightness of a subject and the operation for measuring a distance to the subject and for automatically focusing on the subject, which are performed by the image processing IC 102 and the Bμcom 101 on the basis of output image data obtained by the imager 111 and converted into a digital signal by the imager driving IC 110, are hereinafter respectively referred to as "LV photometric measurement" and "LVAF" if necessary.

Figure 10:
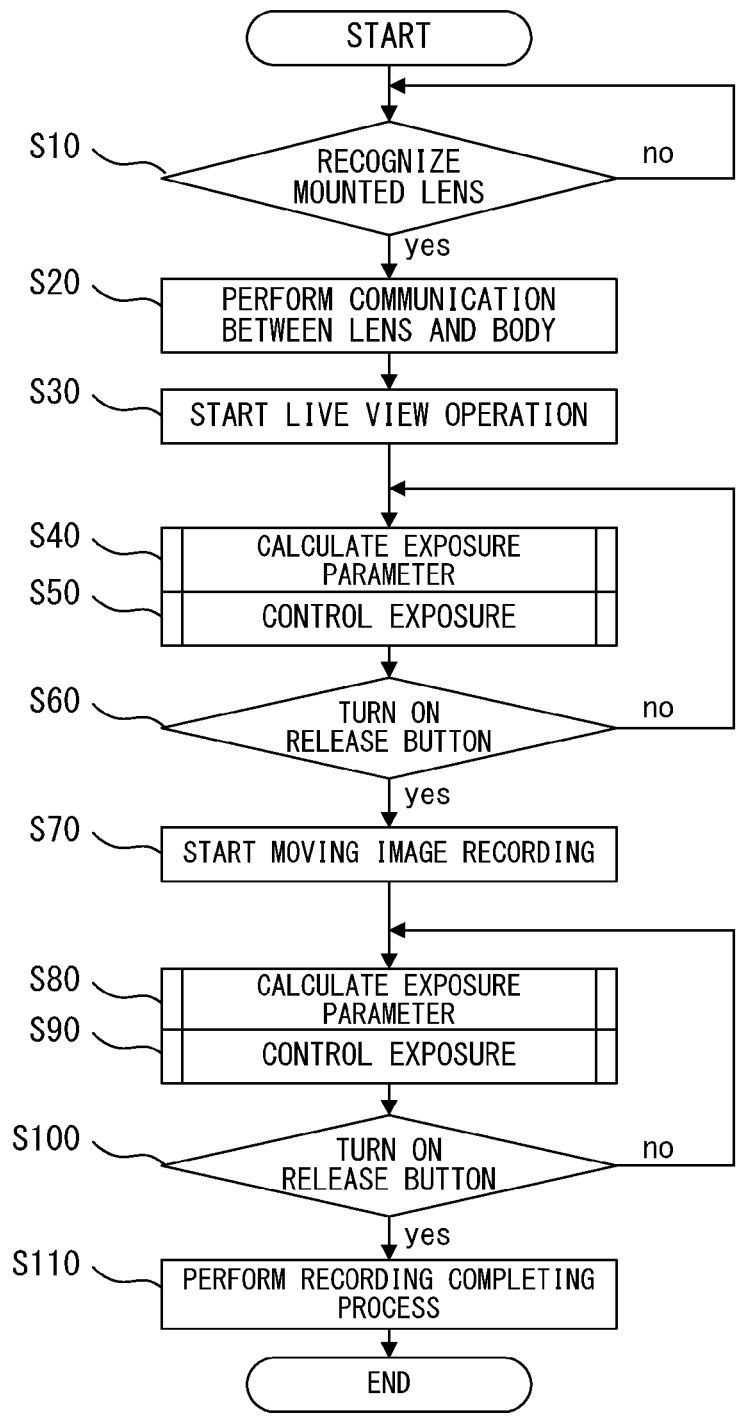
FIG. 10 shows a flowchart indicating an example of a basic operation performed by a camera according to one embodiment of the present invention.
Figure 11:
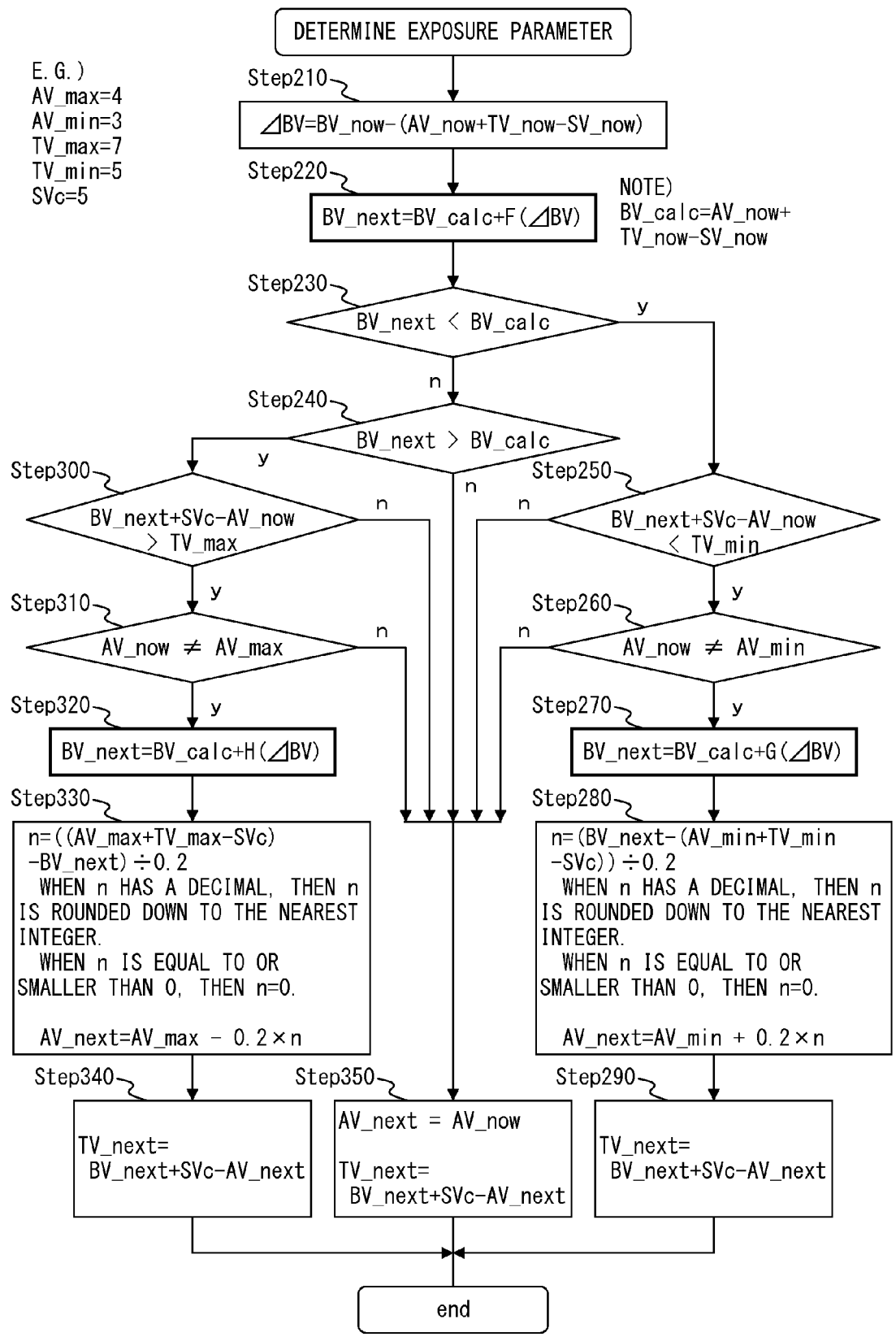
FIG. 11 shows a flowchart indicating an example of details of an exposure parameter calculation process performed by a camera according to one embodiment of the present invention.

FIG. 10 shows a flowchart indicating an example of a basic operation performed by the camera according to the present embodiment. FIG. 11 shows a flowchart indicating an example of details of an exposure parameter process performed by the camera according to the present embodiment.

(Step S10)

When the body unit 100 is powered on or the lens unit 200 is connected and when the body unit 100 recognizes that the lens unit 200 is connected, step S20 is performed.

(Step S20)

Via the communication connector 160, a vertical synchronizing signal of the imager 111 is transmitted from the body unit 100 to the lens unit 200.

Information indicating an aperture controlling speed, a driving time period (e.g., a time needed for performing one-step driving of the aperture), and the like is transmitted from the Lμcom 201 of the lens unit 200 to the Bμcom 101 of the body unit 100. It is also possible for a predetermined aperture driving time period to be transmitted from the Bμcom 101 of the body unit 100 to the lens unit 200, and the Lμcom 201 of the lens unit 200 would then report to the body unit 100 an aperture amount by which the aperture is moved in the predetermined aperture driving time period.

If the lens unit 200 is not configured such that it transmits the information indicating an aperture driving speed, a predetermined large value is set as an aperture driving time period.

(Step S30)

The shooting lens 201a and the imager 111 are driven and exposed using a predetermined aperture value, electronic shutter speed, and sensitivity value used when the live view operation described above is started.

(Step S40)

By performing the LV photometric measurement described above, a subject brightness is calculated from the photographing output obtained from the previous exposure. Using a program diagram that is established in advance in accordance with the subject brightness, the values of an aperture and a shutter speed and a sensitivity value are calculated for the subsequent exposure.

In the present embodiment, a process as indicated in FIG. 11 indicating an example of details of step S40 (this process will be described later) is performed, and accordingly, control is performed such that in accordance with a brightness change in a subject in an LV, variation in the aperture value is made to be as small as possible. Therefore, it is possible to suppress flickering and the like of images in the LV, thereby presenting attractive LV images for users.

(Step S50)

Using the aperture value and the shutter speed of the electronic shutter calculated in step S40, the lens unit 200 and the imager 111 are controlled and exposed so as to obtain a photographing output P. The brightness of the subject is calculated from the obtained photographing output P and from the aperture value and the shutter speed of the electronic shutter having been set.

Here, if the aperture 203 is driven while the imager 111 is exposed, the previous value is used as a subject brightness value without performing a subject brightness calculation.

(Step S60)

It is determined whether the release switch button of the camera operation switch 150 has been turned ON. When it is judged that the button has been turned ON, the process proceeds to step S70, or otherwise, steps S40 and S50 are repeated during the live view.

(Step S70)

Images obtained in the live view are processed by the image processing IC 102, and they begin to be recorded as moving images in the recording medium 131.

(Step S80)

An aperture value, a shutter speed, and a sensitivity value are calculated from the photographing output P obtained from the previous exposure. This is similar to the process of step S40 described above.

(Step S90)

Using the aperture value and the shutter speed of the electronic shutter calculated in step S80, the lens unit 200 and the imager 111 are controlled and exposed so as to obtain a photographing output P. The brightness of the subject is calculated from the obtained photographing output P and from the aperture value and the shutter speed of the electronic shutter which have been set.

Here, if the aperture 203 is driven while the imager 111 is exposed, the previous value is used as a subject brightness value without performing subject brightness calculation.

(Step S100)

The state of the release button of the camera operation switch 150 is confirmed. If the release button which was pressed in step S60 is pressed again, the process proceeds to step S110. If the release button is not pressed, then the process returns to step S80, automatic exposure is repeatedly performed until the release button is pressed again, and moving image recording is continued. Then, if the release button is pressed, the process proceeds to step S110.

(Step S110)

Moving image recording is terminated. Image recording into the recording medium 131 is terminated, and information indicating that moving image recording has been terminated is displayed on the LCD monitor 140. After the termination of recording, the state returns to a normal live view state in which recording is not performed (step S30).

Afterwards, the process of the actual camera returns to the starting of the live view operation in step S30, and the release stand-by state is achieved; however, for simplicity, a situation is described in which the camera operation is terminated after the completion of step S110.

Next, with reference to FIG. 11 and the like, an example of the operation of "exposure parameter determination" of the aforementioned steps S40 and S80 will be described.

Exposure determination for a still image is performed using an APEX (Additive System of Photographic Exposure) computation, which is used for a camera controlling technology and the like. Assume that in this computation, the following conventional notation is used.

BV: Brightness Value
SV: Sensitivity value
AV: Aperture Value
TV: Time Value

Accordingly, when a subject brightness value BV is obtained, AV, TV, and SV used for photographing with a proper exposure are controlled so that the relationship indicated by the following formula (1) is established.

$$BV+SV=AV+TV \tag{1}$$

In moving image shooting, a photographing output P obtained from the previous exposure, AV, TV, and SV set for this exposure, and a proper photographing output level $P_0$ are used in the following formula:

$$BV=AV+TV+SV+\log_2(P/P_0) \tag{2}$$

The photographing output P is an output value typically having a proportional relationship with luminance, and accordingly, it is indicated using a base 2 logarithm, which would be expressed using a unit system called "step" (EV: Exposure Value). This unit system indicates the number of steps corresponding to deviation from a proper level.

The subsequent exposure is usually performed using AV, TV and SV to get the proper BV value.

However, in the present embodiment, if necessary, control is performed such that a plurality of frames are sequentially and slowly made proper by suppressing the change in exposure parameter. The speed of the exposure parameter control according to the present embodiment is called a brightness reaction speed in view of the fact that in the operation for causing the exposure value to change in reaction to the variation in the subject brightness, the speed of this reaction is controlled in order for the exposure of the camera to be proper to the brightness variation.

In the still image shooting, since rapidity (i.e., small release time lag) is generally pursued, brightness variation in a subject needs to be responded to quickly.

When the subject brightness variation ΔBV occurs in the proper condition in the formula (1), which is a publicly known relational expression, there will be a deviation ΔBV from the proper condition as indicated by the following formula:

$$BV+\Delta BV+SV \ne AV+TV \tag{3}$$

If the response is quick, exposure is performed at a proper level in the subsequent exposure control by simply changing, by ΔBV, exposure parameters composed of an aperture value, a shutter speed, and a sensitivity value.

Meanwhile, if the subject brightness variation is slowly responded to during moving image shooting as in the present embodiment, the exposure parameters are changed in the subsequent exposure so that the amount of change is less than ΔBV.

FIG. 12 shows a graph indicating the control of the brightness reaction speed. The vertical axis and the horizontal axis of the graph are expressed using absolute values. If the exposure deviation amount ΔBV is a negative value, the vertical axis $\Delta BV_{\_next}$ will also be a negative value. In regard to a solid line graph C0, as an example, if the horizontal axis ΔBV is −2, the vertical axis $\Delta BV_{\_next}$ is 2. Similarly, if ΔBV is +2, $\Delta BV_{\_next}$ is +2.

ΔBV is used at the horizontal axis as a value indicating the extent of deviation of exposure from the proper condition. The vertical axis indicates the extent of the correction of the amount of deviated exposure in the previous exposure, the correction being made in the subsequent exposure.

The solid line graph C0 indicates exposure control performed when the aperture is not driven (aperture non-driving region).

A dotted line graph C1 indicates an example of brightness reaction control which is performed when it is determined that the aperture value used in the previous exposure should be changed for the setting of the subsequent exposure (aperture driving region) as in the present embodiment.

Assume that the exposure parameters currently set are $AV_{\_now}$, $TV_{\_now}$ and $SV_{\_now}$. The BV value obtained from the exposure currently set is Bv_now. The exposure parameters to be subsequently set are $AV_{\_next}$, $TV_{\_next}$ and $SV_{\_next}$. In other words, $AV_{\_next}$ is an amount of change of the aperture value.

The brightness $\Delta BV_{\_calc}$ made proper by the exposure parameter which is set this time is defined as $$BV_{\_calc}=AV_{\_now}+TV_{\_now}-SV_{\_now} \tag{4}$$

When there is a brightness variation in the subject, the deviation amount ΔBV corresponding to the deviation from the proper level is calculated from the BV value obtained at this time.

$$\Delta BV=BV_{\_now}-BV_{\_calc} \tag{5}$$

This ΔBV is a horizontal axis parameter in FIG. 12.

$\Delta BV_{\_next}$ of the vertical axis is a value for calculating $BV_{\_next}$, which is a base for determining the subsequent exposure parameter. $\Delta BV_{\_next}$ satisfies next expression (6) as follows:

$$BV_{\_next}=BV_{\_calc}+\Delta BV_{\_next} \tag{6}$$

In the present embodiment, the AV value, TV value and SV value are determined so that brightness $BV_{\_next}$ is a proper value in the subsequent exposure.

When $\Delta BV_{\_next}$ is smaller than $\Delta BV$, e.g., when $\Delta BV$ is −1 step, indicating that the current exposure is 1 step under, and when $\Delta BV_{\_next}$ is −0.5 step, control is performed such that the subsequent exposure is 0.5 step under.

As described above, in the present embodiment, the control indicated by the dotted line graph C1 in FIG. 12 is achieved. Such a control will be described in detail later with reference to the flowchart in FIG. 11.

Next, the aperture driving region and the non-driving region will be described.

FIG. 13 is a program diagram indicating control of the AV value and the TV value relative to the brightness BV according to the present embodiment. Generally, there should also be a diagram of the BV value and SV value; however, for the sake of simplicity, the description herein is based on the assumption that the SV value is fixed as a constant $SV_c$ ($SV_c$=5, in this case).

In the program diagram according to the present embodiment illustrated in FIG. 13, a hysteresis is configured regarding the control of the AV value and TV value. In regard to the shape of the hysteresis, the TV value is long and the AV value is short.

In other words, in the present embodiment, within a predetermined control scope of the TV value (between $TV_{\_min}$=5 and $TV_{\_max}$=7 in the case of the setting example of FIG. 13), as much as possible control is performed such that the relationship indicated by the formula (1) above is maintained using the change in the TV value without changing the AV value. When the TV value almost deviates from the predetermined control scope, control is performed such that the AV value is changed (between $AV_{\_min}$=3.0 and $AV_{\_max}$=4 in this case, and this will be described later).

When the state of the aperture is such that the brightness value TV is less than $TV_{\_min}$ ($TV_{\_min}$=5, in this case) (first shutter speed), the aperture 203 is opened up. Similarly, in regard to the bright side, when the TV value is greater than $TV_{\_max}$ ($TV_{\_max}$=7, in this case) (second shutter speed), the aperture 203 is narrowed.

Figure 14:
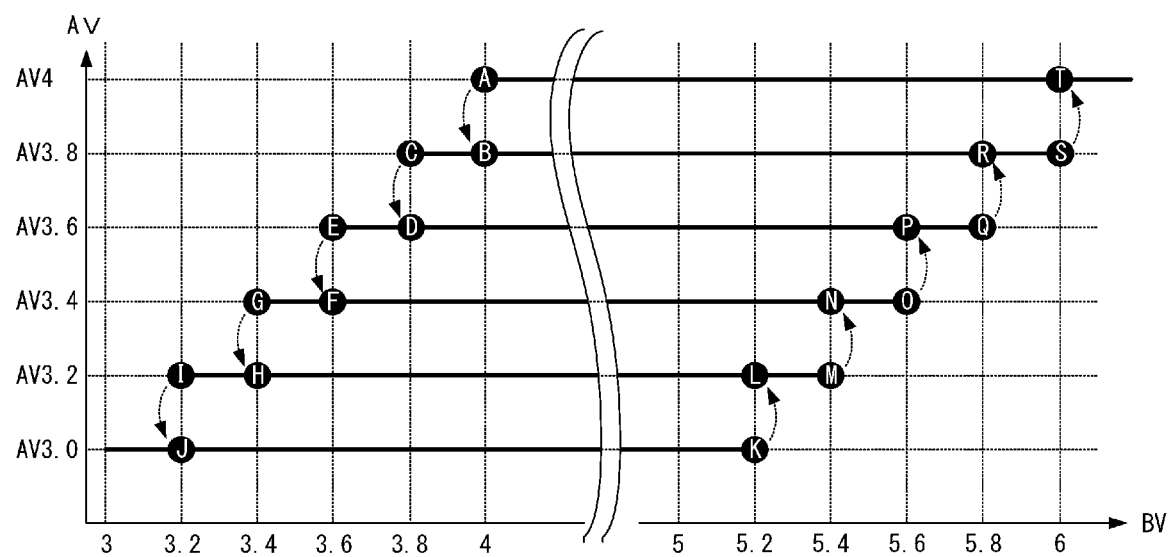
FIG. 14 shows a diagram indicating an example of the relationship between the brightness and the aperture in the hysteresis control of FIG. 13.

FIG. 14 shows a diagram indicating an example of the relationship between brightness and the aperture according to the present embodiment. A hysteresis is configured such that the difference between a brightness at which the AV value is increased and a brightness at which the AV value is decreased is made to be large. An aperture driving region (graph C1) is a region for determining whether an aperture value for the previous exposure should be changed for the subsequent exposure. Details of the aperture driving region will be described in the following, with reference to the flowchart of FIG. 11.

Next, an example of the "exposure parameter determination" process of the aperture driving region (graph C1) will be described on the basis of FIG. 11.

(Step S210)

As described above, using the exposure parameter which was used when the obtained photographing output P was set, a proper brightness $BV_{\_calc}$ is calculated.

$$BV_{\_calc}=AV_{\_now}+TV_{\_now}-SV_{\_now} \quad (7)$$

$\Delta BV$, indicating the amount of the deviation from the proper level of $BV_{\_now}$ calculated from the photographing output P actually obtained, is calculated from the BV value obtained at this time.

$$\Delta BV=BV_{\_now}-BV_{\_calc} \quad (8)$$

When the calculation is completed, the process proceeds to step S220.

(Step S220)

First, the aperture non-driving region is focused on, and $BV_{\_next}$, which is a basis for determining the control indicated by the solid line graph C0 in FIG. 12 and the subsequent exposure parameters AV, TV and SV, is calculated using the following formula (9).

$$BV_{\_next}=BV_{\_calc}+F(\Delta BV) \quad (9)$$

In the flowchart shown in FIG. 11, the graph C0 is indicated using a typical notation function F( ).

Figure 15:
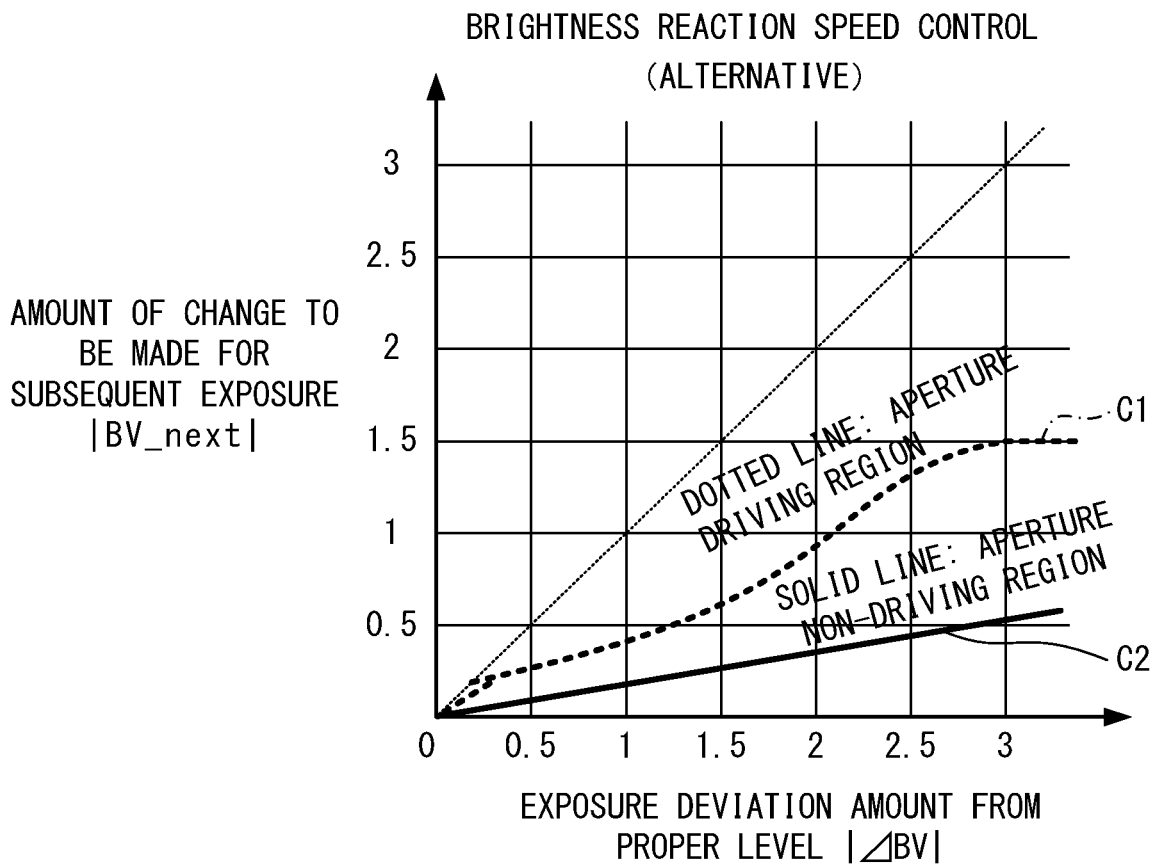
FIG. 15 shows a diagram indicating an alternative of the brightness reaction speed control via an exposure parameter process performed by a camera according to one embodiment of the present invention.

This means that the present embodiment can also be achieved as indicated by, for example, the solid line graph C2 in FIG. 15. In other words, this means that the control according to the present embodiment can also be used when it is necessary to always maintain a slow exposure response speed.

Actually, it is expected that F( ) of the graph C0 will be made to be a proper function so that the brightness reaction speed of the aperture driving region (graph C1) and the brightness reaction speed of the aperture non-driving region (graph C2) do not become too high. This embodiment will be described using the case of FIG. 12 as an example. When the calculation indicated by formula (9) is completed, the process proceeds to step S230.

(Step S230)

It is determined whether the current exposure is "under".

$BV_{\_next}$ indicating the proper brightness for the subsequent exposure, is compared with the proper brightness $BV_{\_calc}$ for the exposure parameter applied when the current photographing output P is obtained, and when $BV_{\_next}$ is smaller, the exposure parameter is adjusted for a dark subject. In other words, at least one of opening-up of the aperture 203, extending of the shutter speed of the electronic shutter, and increasing of the sensitivity value of the electronic shutter is performed.

When the current exposure is "under", the process proceeds to step S250, and when the current exposure is not "under", the process proceeds to step S240.

(Step S240)

In contrast to the case of step S230, it is determined whether the current exposure is on the "over" side.

When $BV_{\_next}$ is higher than $BV_{\_calc}$, an operation is performed such that the exposure is proper for a higher brightness than the current brightness, and accordingly, at least one of driving of the aperture 203 to be narrowed, shortening of the shutter speed, and decreasing of the sensitivity value is performed.

When the current exposure is on the "over" side, the process proceeds to step S300. When the current exposure is not on the "over" side, i.e., when the current exposure is proper, the process proceeds to step S350.

(Step S250)

When $BV_{\_next}<BV_{\_calc}$ is established in step S230 described above and brightness $BV_{\_next}$ is made proper and when only the shutter speed is changed under the current aperture value, it is determined whether the TV value is smaller than 5.

The determination is performed using the current aperture value $AV_{\_now}$ and the sensitivity value SV value (the explanation will be given on the assumption that $SV_c$=5 is maintained as described above), and $BV_{\_next}$.

The determination is performed using formula (10) to which formula (1) is applied, which is a conditional expression for obtaining a proper exposure.

$$BV_{\_next}+SV_c<AV_{\_now}+TV_{\_min} \quad (10)$$

When formula (10) is satisfied, it will be indicated that the TV value is smaller than $TV_{\_min}$ (in this case, $TV_{\_min}=5$) if the aperture 203 is not opened up; therefore, the process proceeds to step S260.

Here, the meaning will be described of the determination that when the aperture is not changed and when the TV value is smaller than $TV_{\_min}$, the aperture is opened up.

As illustrated by the program diagram of FIG. 13 described above, the camera typically selects AV, TV and SV from the BV values via the program diagram.

In the present embodiment, the control for opening up the aperture 203 only when the TV value is smaller than $TV_{\_min}$ is for achieving the control indicated by the program diagram of FIG. 13, which has a hysteresis. Program diagrams having a hysteresis were described with reference to FIGS. 3, 4, 5, 6, 7 and 8.

In regard to the present embodiment, explanations are given on the assumption that $SV_c=5$ is maintained; accordingly, the relationship between the AV value, the TV value, and the BV value is indicated in FIG. 13. The vertical axis indicates an AV value and the horizontal axis indicates a TV value. Slanted lines indicate BV values.

In step S300, which will be described later, when TV is greater than $TV_{\_max}$ (in this case, $TV_{\_max}=7$), the aperture 203 is narrowed using formula (15); accordingly, an approximate two-step hysteresis is formed.

When formula (10) is not established, it is indicated that the TV value is greater than $TV_{\_min}$ (in this case, $TV_{\_min}=5$) without changing the aperture; therefore, it is determined that the aperture does not need to be changed and the process proceeds to step S350.

(Step S260)

Assume that $AV_{\_min}$ indicates the smallest aperture value determined in advance and within the driving scope of usage of the aperture for moving image shooting (in this case, $AV_{\_min}=3.0$). $AV_{\_min}$ is determined in accordance with that the AV value cannot be a small value due to physical constraints when the aperture 203 is opened up, and the design principles that the depth of field needs to not be too great in order to maintain the usability of the camera, and the like.

When the aperture value currently set is $AV_{\_min}$, no further attempts to open up the aperture 203 are made, and the TV value is made smaller than $TV_{\_min}$ so that it is a proper value. Therefore, it is determined that the aperture 203 is not driven, and the process proceeds to step S350.

When the aperture value currently set is not $AV_{\_min}$, the process proceeds to step S270.

(Step S270)

When all of the determination conditions in steps S230, S250 and S260 are fulfilled, the current aperture value needs to be arranged in the subsequent exposure so that the aperture 203 is opened up. In other words, it is assumed that the aperture driving region (graph C1) in FIG. 12 has been fixed.

In order to reduce the brightness reaction speed, $BV_{\_next}$ is calculated again and the amount of change from $BV_{\_calc}$ is made small using the following formula (11) on the basis of $\Delta BV$, which is a deviation from a proper exposure level.

$$BV_{\_next}=BV_{\_calc}+G(\Delta BV) \quad (11)$$

Function $G(\Delta BV)$ for determining $\Delta BV_{\_next}$ is a function for achieving the control indicated by the dotted line graph C1 in FIG. 12. Function $G(\Delta BV)$ is calculated by referring to a table, such as the one indicated in FIG. 16, which stores the relationship of $\Delta BV_{\_next}$ to $\Delta BV$, by using an approximate function or the like. In regard to function $G( )$, calculation is performed such that the absolute value of $G(\Delta BV)$ is smaller than the absolute value of $\Delta BV$.

In the present embodiment, by suppressing a brightness reaction speed using the calculation above, the aperture driving amount of the aperture to be driven in one aperture driving operation, which is calculated in steps S280 and S290 described later, is suppressed; accordingly, the amount of exposure deviation is also suppressed, the exposure deviation being caused while the aperture is driven. As a result, even while the aperture is driven, good moving image shooting is achieved in which only a small amount of flickering appears.

If the driving amount of the aperture is profusely suppressed in order to suppress flickering, the brightness reaction speed is reduced; therefore, in the case of a subject indicating great brightness variation, a proper exposure may rarely be achieved, and accordingly, it is possible that the composition cannot be confirmed.

Accordingly, in the present embodiment, as indicated by the dotted line graph C1 in FIG. 12, as the amount of exposure deviation from a proper level, i.e., $\Delta BV$, increases, the amount of reaction to brightness, i.e., $\Delta BV_{\_next}$ is made to be greater. Accordingly, when exposure deviates a significant amount, the aperture is driven a significant amount. Therefore, exposure can be caused to react properly even in the case of a subject having great brightness variation.

FIG. 17 indicates a relational expression between a general photographing output P, a moving image file recorded in a recording medium, and digital data of an image file. The curve C3, which is typically called a gamma curve, is used when a photographing output P is converted to be adapted to a moving image file format.

The photographing output P is converted to be adapted to a data type that addresses a smaller data amount; therefore, in a region corresponding to a small photographing output P and in a region corresponding to a large photographing output P, even if the photographing output P is changed by $\Delta Dig$, an amount of change in data $\Delta Dig'$ of an image file is made to be smaller than $\Delta Dig$ by compressing the data.

As described above, the information held by the photographing output P is stored in an image file so that the photographing output. P has a large amount of information about the gray scale gradation that is approximately the proper level of the photographing output P. This also applies to a live view display in which an image file recorded via shooting is displayed on a monitor.

As described above, in a region separated from a proper level of photographing outputs, image outputs finally provided are compressed; therefore, in comparison with a situation in which photographing is proper, exposure deviation during the driving of the aperture is relatively less prominent in the compressed region.

Therefore, in this compressed region, a control is performed such that priority is given to a brightness reaction speed and the aperture is moved a significant amount. Because of this control, it is possible to reduce a problem whereby the composition cannot be confirmed since exposure is not adjusted for a long time. In addition, when the exposure is approximately proper so that the composition can be sufficiently confirmed, both brightness reaction and flickering protection can be achieved by adjusting the amount of aperture driving little by little so that the flickering is not prominent, without reducing the brightness reaction speed.

In addition, in the present embodiment, as indicated in FIG. 16, if the absolute value of the deviation amount $\Delta BV$ is three steps or greater, the aperture driving amount for one movement is limited to 1.5 steps. This lengthens the period of the aperture driving time when the aperture driving amount is large; therefore, it is possible to advantageously reduce the frequency of a situation in which a plurality of frames include an image whose exposure deviates during the aperture driving.

As an example, in the case of an interchangeable-lens camera, in accordance with the driving speed of an aperture mechanism provided at a mounted lens, the numeric value may be changed from 1.5 steps. In the case of, for example, a lens with slow aperture driving, $\Delta BV_{\_next}$ may be set to one step at most.

In other words, by setting an optimum brightness reaction speed for the characteristic of the aperture, the quality of moving images and the brightness reaction speed can be controlled under the optimum condition (balance).

When recalculation of $BV_{\_next}$ is completed, the process proceeds to step S280.

(Step S280)

In step S280, an aperture value to be subsequently set is calculated.

In order to determine an aperture value under a predetermined changing step (in this case, a 0.2-step resolution), calculation is performed using the following formula (12).

$$n = (BV_{\_next} - (AV_{\_min} + TV_{\_min} - SV_c)) \div 0.2 \tag{12}$$

When n has a decimal, then n is rounded down to the nearest integer. When n≦0, then n=0. Using the following formula (13), an aperture value to be subsequently set is calculated. In this case, however, $AV_{\_min}=3$.

$$AV_{\_next} = AV_{\_min} + 0.2 \times n \tag{13}$$

In formula (13), the changing step is set to a 0.2-step resolution so that a hysteresis is configured between the aperture and the shutter speed.

The component corresponding to the brightness indicated by $(AV_{\_min}+SV_c)$ in formula (12) indicates a brightness that indicates a proper exposure when the aperture is opened up to the maximum ($AV=AV_{\_min}$) and when the TV value is $TV_{\_min}$.

Formula (12) is a calculation for determining the amount of change of the aperture value for obtaining a proper exposure at 0.2 step by increasing the AV value from $AV_{\_min}$ by the brightness difference of $BV_{\_next}$ from the brightness of a proper exposure when the aperture is opened up to the maximum.

Therefore, "0.2×n" in formula (13) indicates the amount of change of an aperture value.

Value n is rounded down to the nearest integer so that in the calculation of $TV_{\_next}$ in the following step S290, $TV_{\_next}$ does not become smaller than $TV_{\_min}$ (in this case, 5).

By making the difference between $BV_{\_next}$ and $BV_{\_calc}$ to be small in the previous step S270, it is possible that the amount of change of the AV value will be smaller than 0.2 step and the aperture will be the same as $AV_{\_calc}$. However, if the brightness reaction speed is determined in accordance with the determinations in steps S230, S350 and S260 in which it is determined whether or not the region is the aperture driving region without changing the brightness reaction speed in accordance with presence/absence of aperture change, then the frequency of change in the brightness reaction speed does not become too high. Therefore, pleasant-looking image displaying is achieved in LVs.

(Step S290)

Using the BV value and the AV value determined in steps S270 and S280, $TV_{\_next}$ which is the subsequent exposure parameter, is calculated by formula (14).

$$TV_{\_next} + BV_{\_next} + SV_c - AV_{\_next} \tag{14}$$

Via this calculation, the aperture driving region (graph C1) as well as the aperture, the shutter speed, and the sensitivity value (aperture, shutter speed, and sensitivity value are the subsequent exposure parameters in the case of driving the aperture 203 so that it is opened up) are established; therefore, the exposure parameter process is terminated.

(Step S300)

When brightness $BV_{\_next}$ is made proper without changing the aperture, it is determined whether the TV value indicating a shutter speed is higher than 7.

The determination is performed using the current aperture value $AV_{\_now}$ and sensitivity value SV value (in this case, $SV_c=5$) and $BV_{\_next}$.

In other words, the determination is performed using the following formula (15) to which formula (1) described above is applied, which is a conditional expression for obtaining a proper exposure.

$$BV_{\_next} + SV_c > AV_{\_now} + TV_{\_max} \tag{15}$$

When formula (15) is satisfied, it would be indicated that the TV value is larger than $TV_{\_max}$ (in this case, $TV_{\_max}=7$) if the aperture 203 is not narrowed; therefore, the process proceeds to step S310.

As was described with reference to step S250, the determination here that the aperture 203 is narrowed only when the TV value is larger than $TV_{\_max}$ is made in order to configure a hysteresis.

When formula (15) is not satisfied, it is indicated that the TV value is greater than $TV_{\_min}$ (in this case, $TV_{\_min}=5$) without changing the aperture; therefore, it is determined that the aperture does not need to be changed and the process proceeds to step S350.

(Step S310)

Assume that $AV_{\_max}$ indicates the largest aperture value which is determined in advance and which is within the scope of usage of the aperture for moving image shooting. $AV_{\_max}$ is determined in accordance with the AV value cannot be a large value due to physical constraints when the aperture 203 is maximally narrowed, or the design principles that the resolution is not lost due to a diffraction limit in order to maintain the usability of the camera, and the like.

When the aperture value currently set is the largest within the range of driving of the aperture 203 used for the live view, the aperture is no longer moved and the TV value is made to be equal to or higher than $TV_{\_max}$ (in this cased, $TV_{max}=7$) so that it is a proper value. Therefore, it is determined that the aperture 203 is not moved and the process proceeds to step S350.

If the aperture value $AV_{\_now}$ currently set is not $AV_{\_max}$, the process proceeds to step S320.

(Step S320)

In accordance with steps S240, S300 and S310, the current aperture value needs to be controlled in the subsequent exposure so that the aperture 203 is narrowed. In other words, it is assumed that the aperture driving region (graph C1) in FIG. 12 has been fixed.

In order to reduce the brightness reaction speed, $BV_{\_next}$ is calculated again and the amount of change from $BV_{\_calc}$ is made small using the following formula (16)

$$BV_{\_next} = BV_{\_calc} + H(\Delta BV) \tag{16}$$

Function $H(\Delta BV)$ for determining $\Delta BV_{\_next}$ from $\Delta BV$ is a function for achieving the dotted line graph C1 in FIG. 12. Function $H(\Delta BV)$ is calculated by referring to a table, such as the one indicated in FIG. 18, which stores the relationship of $\Delta BV_{\_next}$ to $\Delta BV$, by using an approximate function, or the like. In regard to function H( ) calculation is performed such that the absolute value of $H(\Delta BV)$ is smaller than the absolute value of $\Delta BV$.

In regard to the present embodiment, the only difference from function G (ΔBV) illustrated in step S270 described above are the symbols. The intention of the control is the same as that described in step S270.

In regard to the present embodiment, for simplicity, the dotted line graph C1 in FIG. 12 indicating function H( ) is expressed in the same manner as function G( ) described above.

For reference, when a situation in which a bright image is instantaneously displayed due to exposure deviation during aperture driving is compared with a situation in which a dark image is instantaneously displayed due to exposure deviation during aperture driving, flickering is more prominent in the situation in which a bright image is instantaneously displayed.

If a bright image is instantaneously displayed, the dazzling light will blind the user's eyes; accordingly, the user would think that instantaneous displaying of bright images looks worse than instantaneous displaying of dark images. Accordingly, the absolute value of function H (ΔBV) in step S320 may be greater than the absolute value of function G (ΔBV) in step S270 described above so as to increase the brightness reaction speed.

If $BV_{\_next}$ in the aperture driving region is calculated, the process proceeds to step S330.

(Step S330)

In step S330, an aperture value to be subsequently set is calculated.

In order to determine an aperture value at a 0.2-step resolution, a calculation is performed using the following formula (17).

$$n=((AV_{\_max}+TV_{\_max}-SV_c)-BV_{\_next})\div 0.2 \quad (17)$$

If n has a decimal in formula (17), then n is rounded down to the nearest integer. When n≦0, then n=0. Using the following formula (18), an aperture value to be subsequently set is calculated. In this case, however, $AV_{\_max}=4$.

$$AV_{\_next}=AV_{\_max}-0.2\times n \quad (18)$$

In formula (18), the changing step is set to a 0.2-step resolution for the same reason as was described with reference to step S280 above.

Value n is rounded down to the nearest integer so that in the calculation of $TV_{\_next}$ in the following step, S340, $TV_{\_next}$ does not become larger than $TV_{\_max}$ (in this case, $TV_{\_max}=7$) due to an erroneous difference caused via the 0.2-step resolution when $AV_{\_next}$ is smaller than $AV_{\_max}$.

By making the difference between $BV_{\_next}$ and $BV_{\_calc}$ to be small in step S320, it is possible that the amount of change of the AV value will be smaller than 0.2 step and the aperture will be the same as $AV_{\_calc}$. This gist is the same as the idea which was described above with reference to step S280.

In step S330, $AV_{\_next}$ is fixed. When the calculation of formula (18) is completed, the process proceeds to step S340.

(Step S340)

Using the BV value and the AV value determined in steps S320 and S330, $TV_{\_next}$, which is the subsequent exposure parameter, is calculated by formula (19).

$$Tv_{\_next}=Bv_{\_next}+SV_c-AV_{\_next} \quad (19)$$

Via this calculation, the aperture driving region as well as the aperture, the shutter speed, and the sensitivity value, (aperture, shutter speed, and sensitivity value are the subsequent exposure parameters in the case of driving the aperture so that it is narrowed) are established; therefore, the exposure parameter process is terminated.

(Step S350)

If the exposure does not need to be changed since it is indicated in steps S230 and S240 that $BV_{\_calc}$ is the same as $BV_{\_next}$ and if it is determined in steps S250, S260, S300 and S310 that the region is the aperture non-driving region (graph C0), the current aperture value $AV_{\_now}$ is continuously used as the subsequent exposure $AV_{\_next}$ since it is determined that the aperture 203 has not been changed. In other words, calculation is performed using the following formula (20).

$$AV_{\_next}=AV_{\_now} \quad (20)$$

Also in regard to the brightness reaction speed, using the value calculated in step S220, the TV value and the SV value are calculated via formula (14) described above.

If the aperture is not changed in step S350, this means that the subsequent exposure parameters (i.e., aperture, shutter speed, and sensitivity value) have been established. Therefore, the exposure parameter process is terminated.

The above are descriptions of the flowchart of FIG. 11 indicating an example of details for determining exposure parameters in steps S40 and S80 in FIG. 10 described above.

Under the condition in which the exposure parameters calculated here are set in step S50 or S90 in FIG. 10, displaying of LV images and exposure of moving image recording are controlled.

Via the process returning from step S60 to step S40 and from step S100 to step S80, exposure parameters are repeatedly calculated, thereby generating consecutive moving images.

Here, in the case of the present embodiment, in the calculation method for exposure parameters, by calculating a brightness reaction speed and by configuring a hysteresis in which an AV value is expressed in detail, the aperture is moved little by little when the exposure is near a proper level, and this will reduce brightness flickering which would occur while the aperture is driven and will improve the qualify of LV images and the quality of recorded moving images. When the exposure is "under" or "over", the brightness reaction speed is increased by driving the aperture a relatively large amount. Because of such a configuration, shutter chances will not be missed when static image shooting is performed during LV displaying.

The embodiments above were described on the assumption that the SV value is a fixed value (in this case, $SV=SV_c=5$); however, if the SV value is made variable in the program diagram of FIG. 13, the width of the hysteresis will be wider, and therefore, when the subject is made brighter or darker continuously, it is possible to further reduce the frequency of the driving of the aperture 203. Such a fact is easily known.

In step S250, calculation is performed using the fixed SV value, i.e., $SV_c=5$, so that the TV value is smaller than $TV_{\_min}$ (in this case, $TV_{\_min}=5$); however, in a system in which a camera can change the SV value to 8 at the highest, calculation is performed by substituting $SV_c=8$ into the computation expression (i.e., formula (10)) in step S250 as indicated by the following formula (21).

$$BV_{\_next}+8-AV_{\_now}<TV_{\_min} \quad (21)$$

By performing calculation in this way, the aperture 203 is not driven so that it is opened up, if it does not become darker.

If $TV_{\_next}$ is smaller than $TV_{\_min}$ (in this case, $TV_{\_min}=5$) after the calculations in steps S290 and S350 in FIG. 11, $TV_{\_next}$ is set to be $TV_{\_min}$, and the SV value is calculated by the following formula (22).

$$SV_{\_next}=BV_{\_next}+TV_{\_min}-AV_{\_next} \quad (22)$$

As described above, according to the present embodiment, by changing the sensitivity value (SV) and the shutter speed (TV) more preferentially than the aperture value (AV), a program diagram is established which has a hysteresis characteristic in which the aperture 203 is not operated as much as possible; by changing the amount of change in the aperture in accordance with the difference between a targeted exposure level and the current exposure level and by making the brightness reaction speed to be different for both the aperture driving region and the aperture non-driving region, sudden brightness variations (flickering) in moving images via a live view are reduced.

As a result of this, in regard to, for example, an interchangeable-lens camera mounted with a live view function with which composition confirmation is performed using images output from the imager 111, even when the lens unit 200 optimized for still image shooting and having, for example, the aperture driving mechanism 202 and the aperture 203 of a step-driving type is mounted, it is possible to prevent degradation of the appearance of live view images and degradation of the quality of recorded moving images, which would be caused by flickering in the live view images due to the aperture driving during the moving image shooting.

In other words, according to the embodiments of the present invention, it is possible to improve the appearance of live view images provided by driving the aperture during moving image shooting and to improve the image quality of recorded moving images, without this being affected by the operating characteristics such as the step operation of the aperture mechanism of a mounted lens.

In addition, by setting an optimum brightness reaction speed for the aperture, the quality of moving images and the brightness reaction speed can be controlled under the optimum condition (balance). Accordingly, as an example, it is possible to improve the image quality of recorded moving images in the record of moving images in the live view and to improve the quality of still image shooting by shortening the release time lag in still image shooting in the composition confirmation via the live view.

In addition, the operation frequency and the operation speed of the aperture driving mechanism during moving image shooting via a live view are decreased; therefore, operation noise caused by the aperture driving mechanism during moving image shooting will be reduced. This will improve the quality of moving images and the quality of the sounds which are recorded in association with the moving images.

Needless to say, configurations of the present invention are not limited to those configurations illustrated with reference to the embodiments described above, and various changes can be made without departing from the spirit of the present invention.

As an example, the configuration of the camera is not limited to those configurations illustrated with reference to the embodiments described above.

What is claimed is:

1. A camera capable of performing at least one of moving image shooting and live view displaying, the camera comprising:
    a photographing unit for converting an image formed by a shooting lens into an electric signal;
    a subject brightness obtaining unit for obtaining a subject brightness;
    an exposure computing unit for computing a shutter speed and an aperture value on the basis of the subject brightness obtained by the subject brightness obtaining unit;
    a shutter for controlling, on the basis of the shutter speed output by the exposure computing unit, a time period in which the photographing unit accumulates the electric signal; and
    an aperture control unit for controlling, on the basis of the aperture value output by the exposure computing unit, an aperture value of an aperture unit that limits a quantity of light incident from the shooting lens, wherein
    the exposure computing unit calculates a deviation between a previous exposure amount and a proper exposure amount on the basis of brightness information relating to a previous exposure and output by the subject brightness obtaining unit, the aperture value of the aperture unit, and the shutter speed of the shutter, and computes an aperture value of the aperture unit for a subsequent exposure on the basis of the deviation.

2. The camera according to claim 1, comprising:
    a determination unit for determining whether or not to change the aperture value of the aperture unit; and
    a storage unit for storing first information relating to an amount an exposure is changed in accordance with the proper exposure amount and the deviation, wherein
    when the determination unit determines that the aperture value of the aperture unit should be changed, the exposure computing unit computes an aperture value for the subsequent exposure on the basis of the first information output by the storage unit.

3. The camera according to claim 2, wherein:
    the storage unit stores second information relating to an amount an exposure is changed in accordance with the proper exposure amount and the deviation; and
    when the determination unit determines that the aperture value of the aperture unit should not be changed, the exposure computing unit computes a shutter speed for the subsequent exposure on the basis of the second information output by the storage unit.

4. The camera according to claim 3, wherein
in comparison with the second information, the first information indicates a smaller absolute value of an amount an exposure is changed relative to the deviation.

5. The camera according to claim 2, wherein
when a shutter speed relating to a subsequent exposure amount is beyond a scope of a predetermined shutter speed, the determination unit determines that the aperture value should be changed.

6. The camera according to claim 5, wherein:
the scope of the predetermined shutter speed is the same as a scope of a first shutter speed and a second shutter speed;
the storage unit has a program diagram which designates the aperture unit to be on an opened-up side when a shutter speed relating to the same aperture value is lower than the first shutter speed and which designates the aperture unit to be on a narrowed side when the shutter speed relating to the same aperture value is higher than the second shutter speed, which is higher than the first shutter speed; and
the exposure computing unit computes the aperture value on the basis of the program diagram.

7. The camera according to claim 6, wherein
the program diagram configures a hysteresis using, as a single step of change of the aperture value of the aperture unit, a step of an aperture value corresponding to a step of an exposure amount that is smaller than an exposure amount corresponding to a difference between the first shutter speed and the second shutter speed.

8. The camera according to claim 2, further comprising
a sensitivity value setting unit for setting a sensitivity value of photoelectric conversion for a light-receiving amount of the photographing unit; wherein
when a sensitivity value relating to a subsequent exposure amount is beyond a predetermined scope of the sensitivity value, the determination unit determines that the aperture value should be changed, the predetermined scope being set by the sensitivity value setting unit.

9. A camera controlling method for a camera capable of performing at least one of moving image shooting and live view displaying, the method comprising:
   a first step of converting an image formed at a photographing unit by a shooting lens into an electric signal;
   a second step of obtaining a subject brightness;
   a third step of computing a shutter speed and an aperture value on the basis of the subject brightness obtained in the second step;
   a fourth step of controlling, on the basis of the shutter speed computed in the third step, a time period in which the photographing unit accumulates the electric signal; and
   a fifth step of controlling, on the basis of the aperture value output in the third step, an aperture value of an aperture unit that limits a quantity of light incident from the shooting lens, wherein
   in the third step,
      a deviation is calculated between a previous exposure amount and a proper exposure amount on the basis of brightness information relating to a previous exposure and obtained in the second step, the aperture value of the aperture unit, and the shutter speed in the fourth step, and
      an aperture value of the aperture unit is computed for a subsequent exposure on the basis of the deviation.

10. The camera controlling method according to claim 9, the method further comprising:
   a sixth step of determining whether to or not to change the aperture value of the aperture unit; and
   a seventh step of storing first information relating to an amount an exposure is changed in accordance with the proper exposure amount and the deviation,
   in the third step, when it is determined in the sixth step that the aperture value of the aperture unit should be changed, an aperture value is computed for the subsequent exposure on the basis of the first information stored in the seventh step.

11. The camera controlling method according to claim 10, wherein:
   in the seventh step, second information relating to an amount an exposure is changed in accordance with the proper exposure amount and the deviation is stored; and
   in the third step, when it is determined in the sixth step that the aperture value of the aperture unit should not be changed, a shutter speed is computed for the subsequent exposure on the basis of the second information stored in the seventh step.

12. The camera controlling method according to claim 11, wherein
   in comparison with the second information, the first information indicates a smaller absolute value of an amount an exposure is changed relative to the deviation.

13. The camera controlling method according to claim 10, wherein
   in the sixth step, when a shutter speed relating to a subsequent exposure amount is beyond a scope of a predetermined shutter speed, it is determined that the aperture value should be changed.

14. The camera controlling method according to claim 13, wherein:
   the scope of the predetermined shutter speed is a scope of a first shutter speed and a second shutter speed;
   in the seventh step, a program diagram is stored which designates the aperture unit to be on an opened-up side when a shutter speed relating to the same aperture value is lower than the first shutter speed and which designates the aperture unit to be on a narrowed side when the shutter speed relating to the same aperture value is higher than the second shutter speed, which is higher than the first shutter speed;
   in the third step, the aperture value is computed on the basis of the program diagram.

15. The camera controlling method according to claim 14, wherein
   the program diagram configures a hysteresis using, as a single step of change of the aperture value of the aperture unit, a step of an aperture value corresponding to a step of an exposure amount that is smaller than an exposure amount corresponding to a difference between the first shutter speed and the second shutter speed.

16. The camera controlling method according to claim 10, further comprising
   an eighth step of setting a sensitivity value of photoelectric conversion for a light-receiving amount of the photographing unit, wherein
   in the sixth step, when a sensitivity value relating to a subsequent exposure amount is beyond a predetermined scope of the sensitivity value which is set in the eighth step, it is determined that the aperture value should be changed.

* * * * *